United States Patent
Kanai et al.

Patent Number: 5,507,008
Date of Patent: Apr. 9, 1996

[54] CHANNEL ASSIGNMENT METHOD IN MOBILE COMMUNICATION SYSTEM IN WHICH CHANNEL WHICH MEETS PREDETERMINED CRITERIA IS CHANNEL SELECTED

[75] Inventors: Toshihito Kanai; Kojiro Hamabe, both of Tokyo, Japan

[73] Assignee: NEC Corporation, Japan

[21] Appl. No.: 260,491

[22] Filed: Jun. 15, 1994

Related U.S. Application Data

[63] Continuation of Ser. No. 890,561, May 28, 1992, abandoned.

[30] Foreign Application Priority Data

| May 29, 1991 | [JP] | Japan | 3-125760 |
| Oct. 17, 1991 | [JP] | Japan | 3-269704 |
| Dec. 26, 1991 | [JP] | Japan | 3-345624 |
| Dec. 26, 1991 | [JP] | Japan | 3-345626 |

[51] Int. Cl.⁶ ................................................. H04Q 7/26
[52] U.S. Cl. .................. 455/34.1; 455/54.1; 455/62
[58] Field of Search ............................ 455/161.1, 166.1, 455/34.1, 33.1, 33.4, 50.1, 54.1, 54.2, 56.1, 62, 63, 67.1, 67.3, 67.6; 379/59

[56] References Cited

U.S. PATENT DOCUMENTS

| 4,355,411 | 10/1982 | Reudink et al. | 455/33 |
| 4,794,635 | 12/1988 | Hess | 379/60 |
| 5,093,924 | 3/1992 | Toshiyuki | 455/33 |
| 5,140,695 | 8/1992 | Yasuda et al. | 455/238.1 |

FOREIGN PATENT DOCUMENTS

| 0419243 | 3/1991 | European Pat. Off. . |
| 0430173 | 6/1991 | European Pat. Off. . |
| 2-141036 | 5/1990 | Japan . |
| 3-104329 | 5/1991 | Japan . |

OTHER PUBLICATIONS

S. Onoe et al., "Flexible Re–Use for Dynamic Channel Assignment in Mobile Radio System", CH2655–9/89/0000–0472 $1.00 © 1989 IEEE, pp. 472–476.

Kozono et al., "A New Method of Co–Channel D/U Measurement Using Squared Law Envelope Differential Detection", the Institute of Electronics, Information and Communication Engineers, Communication Technical Report, CS83–13, pp. 93–98.

Beck et al., "Strategies for Handover and Dynamic Channel Allocation in Micro–Cellular Mobile Radio Systems," IEE Proceedings, vol. 136, pp. 178–185, May 1989.

Zhang et al., IEE Transactions on Vehicular Technology, 38, Nov. 1989.

Hong et al., IEE Proceedings, vol. 136, pp. 339–346, Oct. 1989.

Primary Examiner—Curtis Kuntz
Assistant Examiner—Philip J. Sobutka
Attorney, Agent, or Firm—Osterlenk, Faber, Gerb & Soffen

[57] ABSTRACT

In a channel assignment method for a mobile communication system, each of base stations respectively arranged in a plurality of cells constituting a service area selects one of all speech communication channels in an order of priority common to all the cells in response to a speech communication request from a mobile station. The base station then checks whether the carrier to interference ratio of the selected speech communication channel is equal to or higher than a predetermined level. The selected channel is assigned as a speech communication channel for the cell when it is determined on the basis of the check result that the carrier to interference ratio is equal to or higher than the predetermined level.

25 Claims, 18 Drawing Sheets

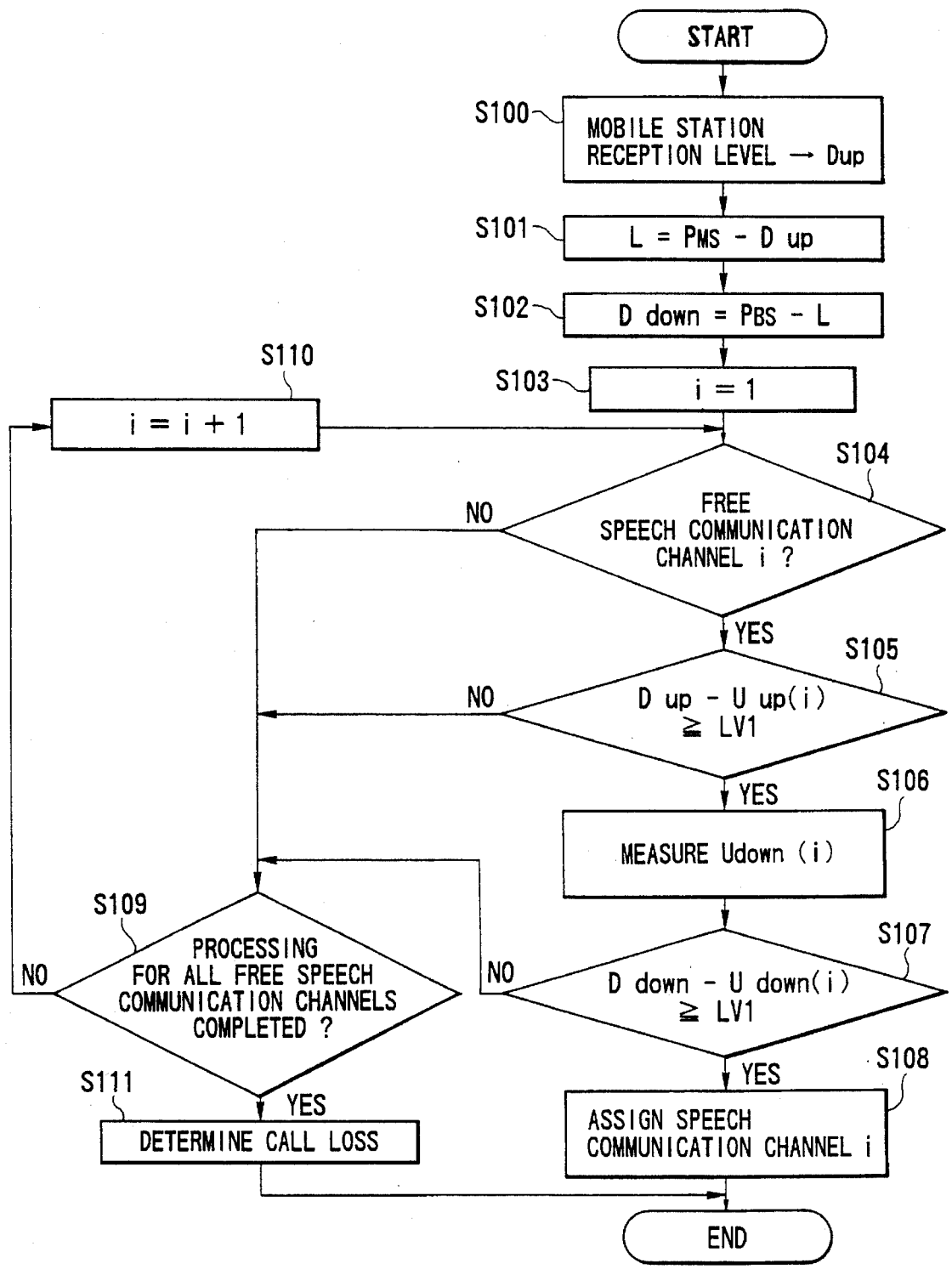
F I G. 1

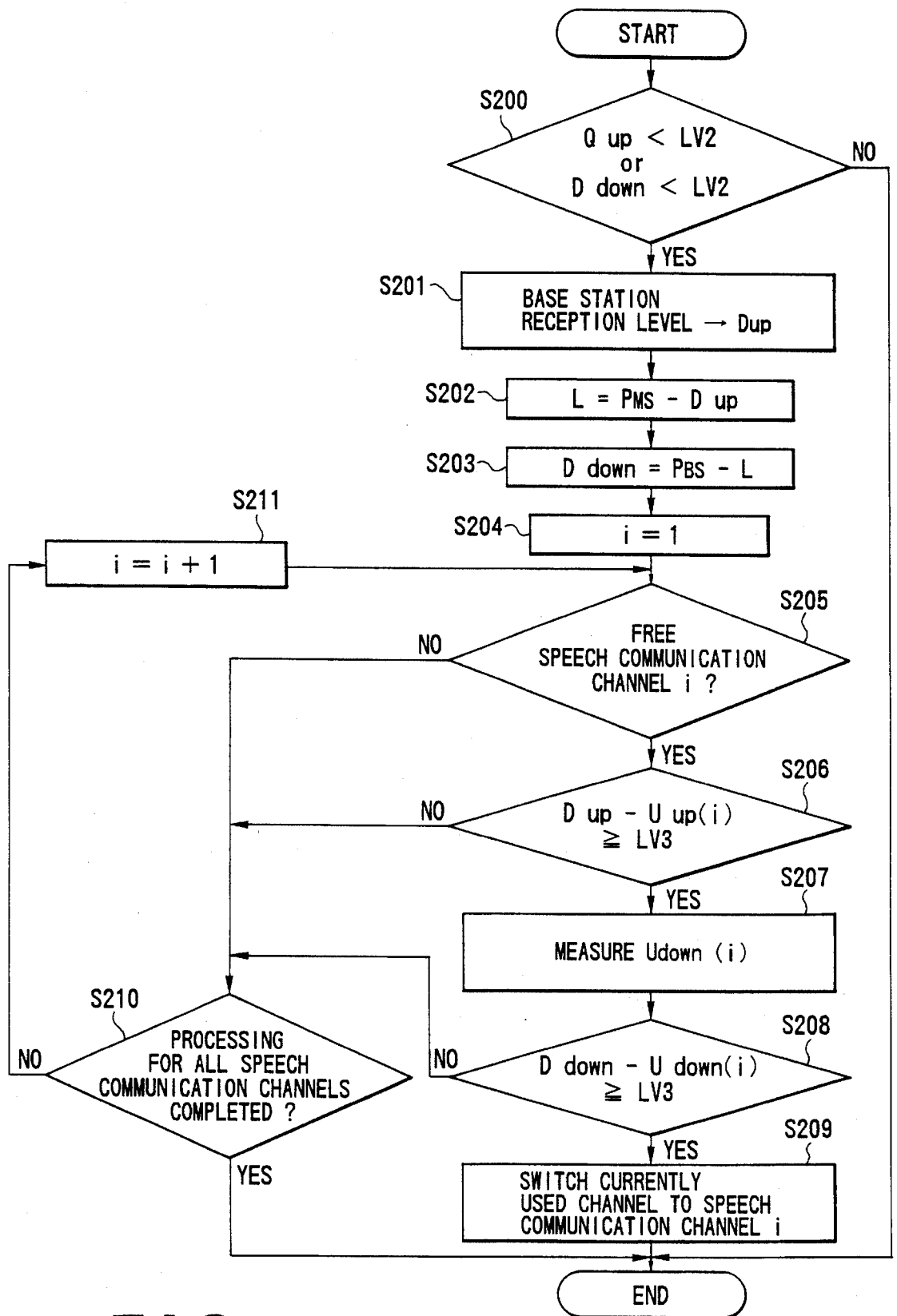
F I G. 2

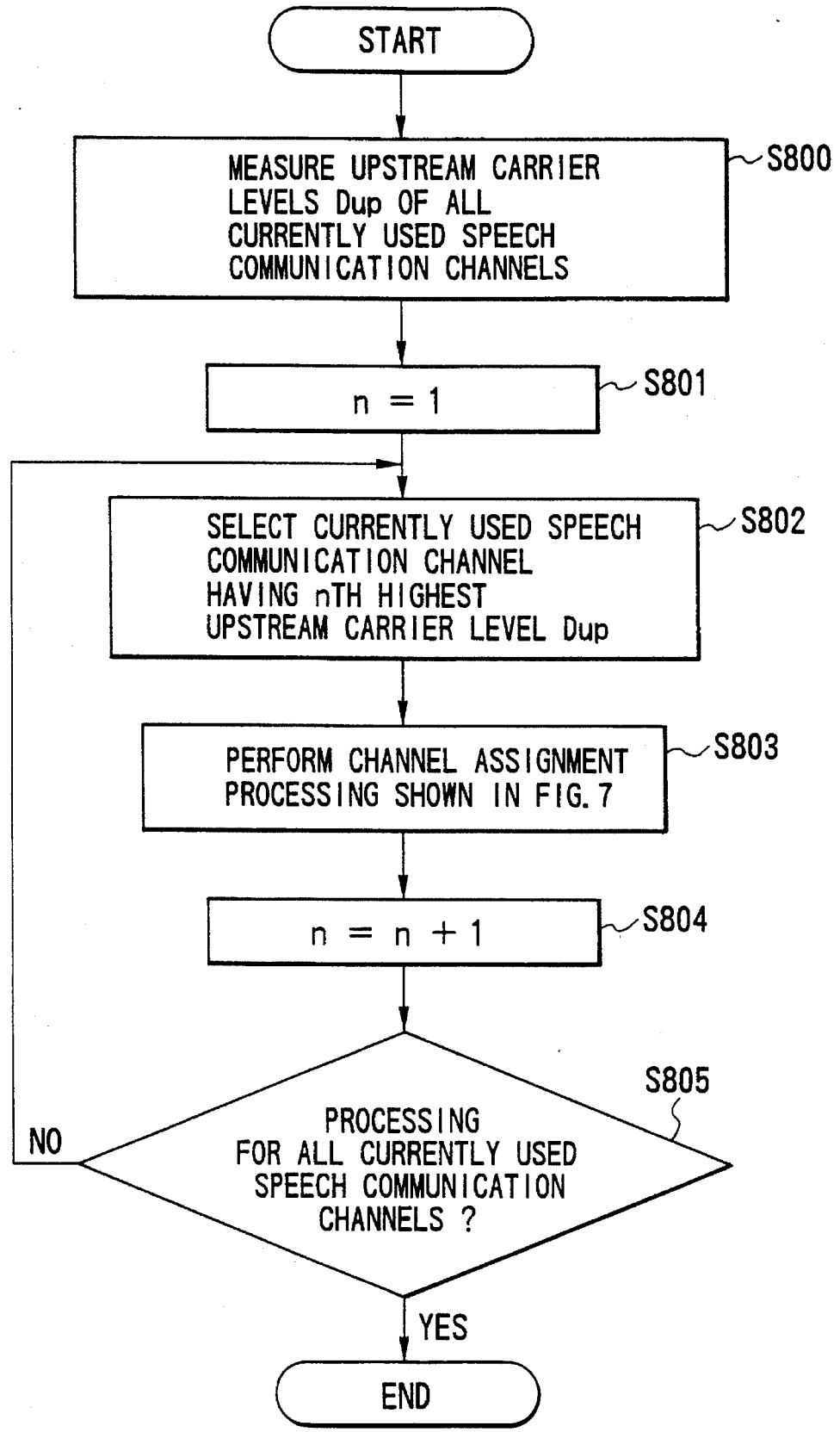
F I G.8

5,507,008

CHANNEL ASSIGNMENT METHOD IN MOBILE COMMUNICATION SYSTEM IN WHICH CHANNEL WHICH MEETS PREDETERMINED CRITERIA IS CHANNEL SELECTED

This is a continuation of application Ser. No. 07/890,561, filed on May 28, 1992 now abandoned.

BACKGROUND OF THE INVENTION

The present invention relates to a channel assignment method in a cellular mobile communication system.

In a large-capacity mobile communication system such as a cellular mobile communication system, a service area is covered by a plurality of cells, each of which is covered by a base station, and the same frequency channel is reused by the base stations between which no interference occurs, thereby realizing the effective use of frequencies. Such a scheme is called a cellular scheme.

Assigning channels to be used by respective base stations is roughly classified into two methods. In one method, channel assignments are fixed to the respective base stations so as not to cause interference on the basis of the predictive results of propagation characteristics. This method is called fixed channel assignment and is generally used in the existing mobile telephone systems. The other method is called dynamic channel assignment in which a channel is selected for every communication so as not to cause interference. Although the control scheme and the apparatus arrangement are complicated, the dynamic channel assignment allows free use of channels as long as interference is prevented. This method, therefore, can accommodate more subscribers than the fixed channel assignment method. For this reason, the application of the dynamic channel assignment method to an automobile telephone system has been studied.

In the dynamic channel assignment method, various schemes have been proposed as algorithms for selecting channels. Especially as a scheme with high efficiency of frequency use, a flexible re-use scheme is known (Syuji Yasuda and Seizo Onoe, "Mobile Communication System", Japanese Patent Laid-Open No. 2-141036, and Seizo Onoe and Syuji Yasuda, "Flexible Re-use for Dynamic Channel Assignment in Mobile Radio Systems", Conference Record of IEEE ICC' 89, Boston, June 1989). In this scheme, as shown in FIG. 22, all free channels are sequentially selected (steps S2200 to S2206). The carrier to interference ratios (to be referred to as the CIR values hereinafter) of downstream and upstream communication are obtained by selecting in order each free channel in a self-zone, moreover the CIR values of upstream and downstream communication of which the channel has already used in another zone which has already used the channel are obtained (steps S2201 and S2202). Thereafter, a channel in which each CIR value equal to or larger than the value of a required level and the average value of the CIR values is minimum is assigned (steps S2207 and S2208). With this processing, the repetition distance of the same frequency is shortened to improve the frequency re-use efficiency.

In the above-mentioned flexible reuse scheme, in order to preferentially assign speech communication channels having small CIR margins, the CIR values of all the free speech communication channels in a self-zone and another zone are measured, each measurement result is compared with a required CIR level, and the average value of the CIR values is calculated, thus requiring complicated processing.

Even if a given channel satisfies required CIR values at the start of speech communication, when the carrier or interference level varies upon traveling of a mobile station, the channel may not satisfy the required CIR values. Such a phenomenon is conspicuous in a system for assigning channels having the minimum CIR values in order to improve the frequency use efficiency. If the required CIR values cannot be satisfied, a deterioration in signal quality occurs, resulting in failure in speech communication.

SUMMARY OF THE INVENTION

It is an object of the present invention to provide a channel assignment method for a mobile communication system, which can achieve high efficiency of frequency use without performing complicated processing.

It is another object of the present invention to provide a channel assignment method for a mobile communication system, capable of suppressing a deterioration in signal quality which is caused by interference.

It is still another object of the present invention to provide a channel assignment method for a mobile communication system, which is not easily influenced by third-order intermodulation.

In order to achieve the above objects, according to the present invention, there is provided a channel assignment method for a mobile communication system, comprising the steps of causing each of base stations respectively arranged in a plurality of cells constituting a service area, in response to a speech communication request from a mobile station, to select one of all speech communication channels in an order of priority common to all the cells, causing the base station to check whether a carrier to interference ratio of the selected speech communication channel is not less than a predetermined level, and assigning the channel as a speech communication channel for the cell when it is determined on the basis of the check result that the carrier to interference ratio is not less than the predetermined level.

BRIEF DESCRIPTION OF THE DRAWINGS

FIG. 1 is a flow chart for explaining the process of control performed by a base station which executes a channel assignment method of the present invention and, more particularly, an embodiment of channel assignment control processing with respect to a speech communication request;

FIG. 2 is a flow chart for explaining the process of control performed by the base station which executes the channel assignment method of the present invention and, more particularly, an embodiment of channel switching control with respect to a currently used speech communication channel;

FIG. 8 is a flow chart for explaining still another embodiment of the control processing performed by the base station which executes the channel assignment method of the present invention;

DESCRIPTION OF THE PREFERRED EMBODIMENTS

Embodiments of the present invention will be described below with reference to the accompanying drawings.

Figure 21:
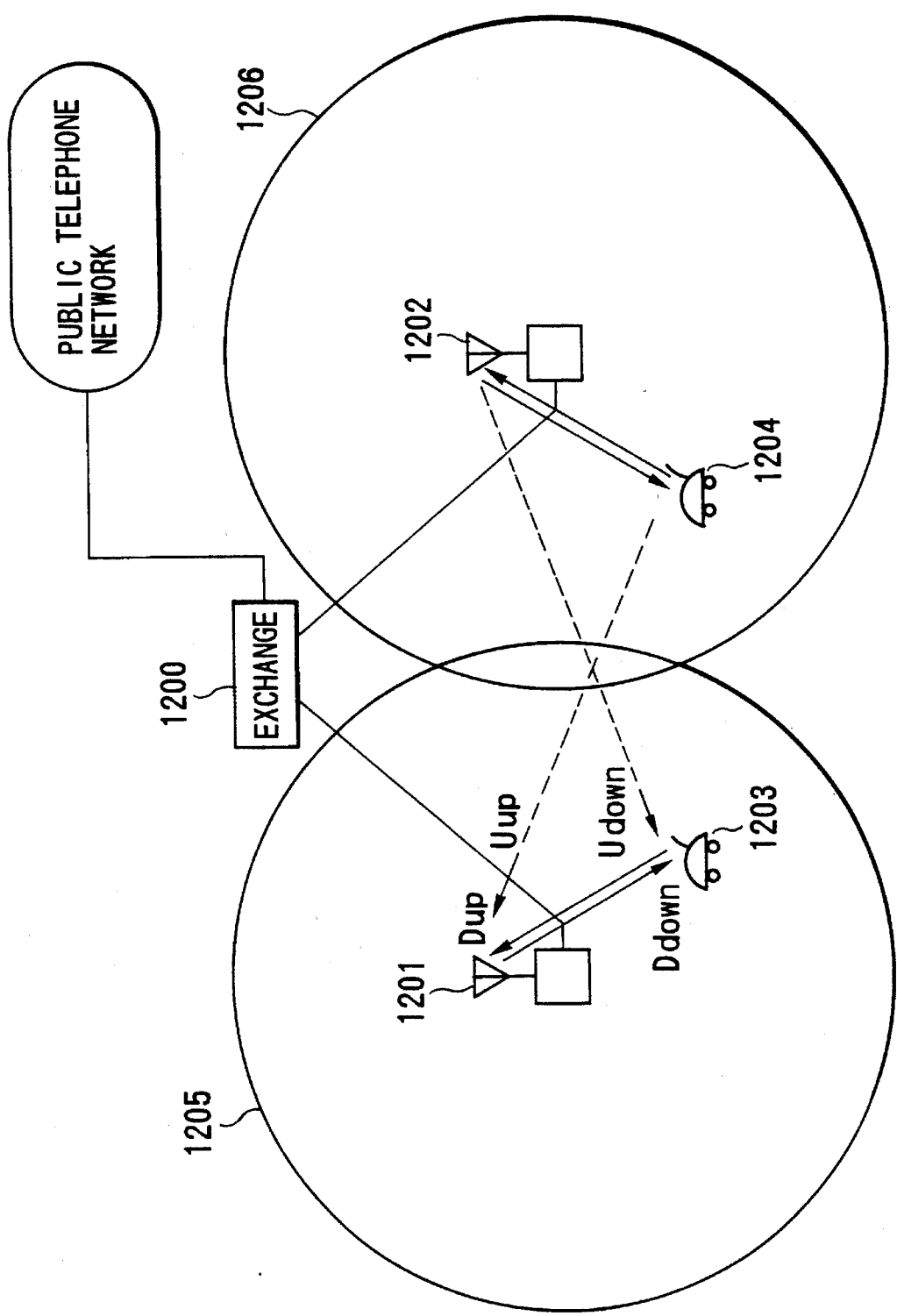
FIG. 21 is a view showing an arrangement of a mobile communication system.
Figure 22:
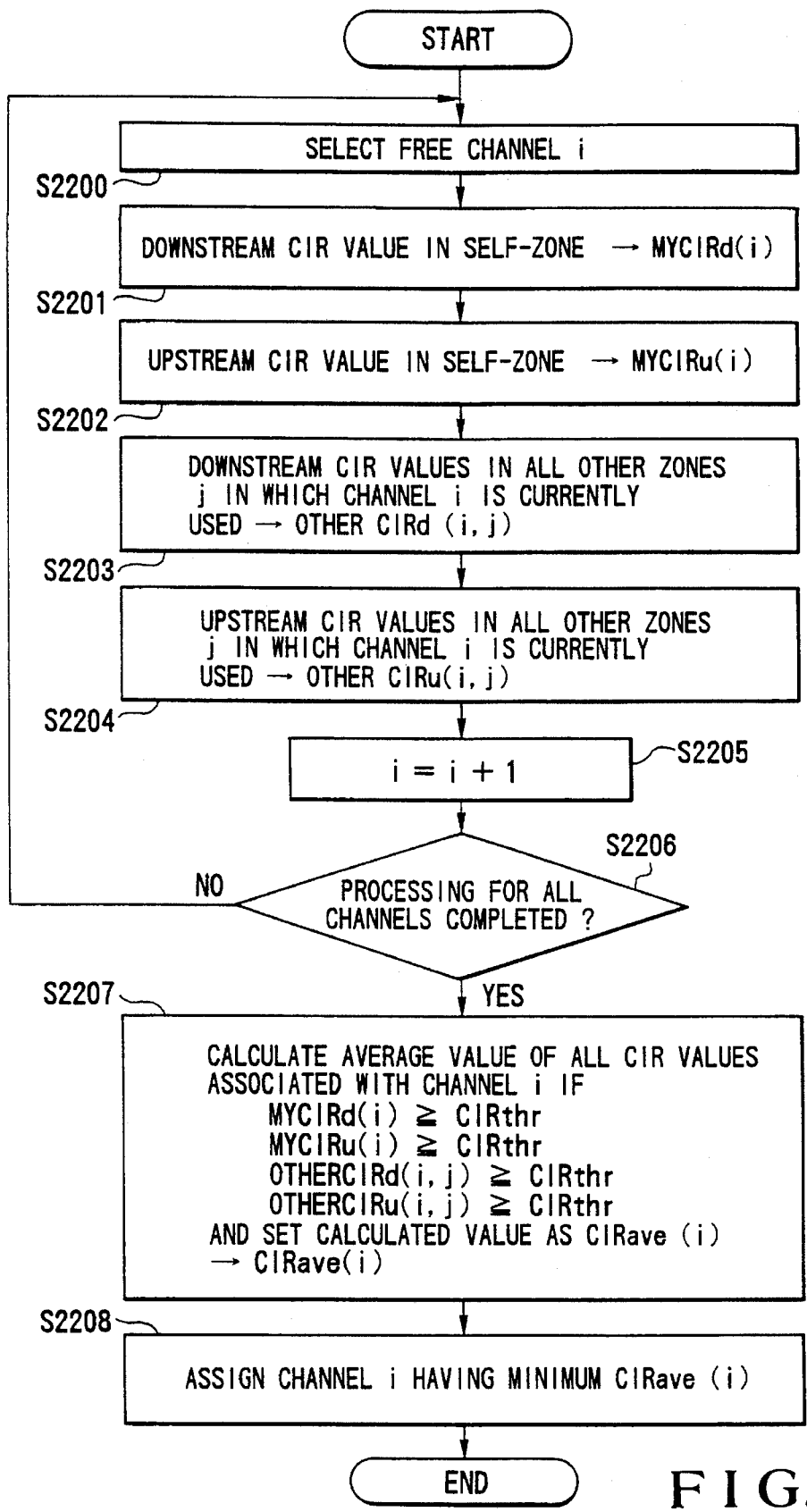
FIG. 22 is a flow chart for explaining a conventional flexible reuse scheme.

FIG. 21 shows the arrangement of a mobile communication system using a channel assignment method according to the present invention. This mobile communication system includes an exchange 1200, a plurality of base stations, e.g., base stations 1201 and 1202, and a plurality of mobile stations, e.g., mobile stations 1203 and 1204. The base stations 1201 and 1202 are respectively covering cells 1205 and 1206. Reference symbols Dup, Uup, Ddown, and Udown respectively denote an upstream carrier level in the base station 1201, an upstream interference level in the base station 1201, a downstream carrier level in the mobile station 1203, and a downstream interference level in the mobile station 1203. When a speech communication request is generated in the mobile station 1203 existing in the cell to which the base station 1201 belongs, a speech communication channel is selected and used, in which an upstream CIR value (Dup-Uup) in the base station 1201 and a downstream CIR value (Ddown-Udown) in the mobile station 1203 are equal to or larger than the values of predetermined levels, respectively.

FIG. 1 shows the process of control performed by a base station which executes the channel assignment scheme of the present invention and, more particularly, an embodiment of channel assignment control to be performed in response to a speech communication request. Assume that the base station periodically receives and stores an upstream interference level Uup(i) of a free speech communication channel, and that transmission power $P_{MS}$ of the mobile station and transmission power $P_{BS}$ of the base station are known.

When a speech communication request is generated, the reception level of an outgoing call request signal (when an outgoing call is to be generated by the mobile station) or an ACK signal (when an incoming call is received by the mobile station) supplied from the mobile station through a control channel is stored, as the upstream carrier level Dup, in the base station (step S100). A value obtained by subtracting the level Dup from the transmission power $P_{MS}$ is set as a propagation loss L between the base station and the mobile station (step S101). Since it can be assumed that reversibility is established between upstream and downstream communication lines and the two lines have the same propagation loss L, the downstream carrier level Ddown in the mobile station can be obtained by subtracting the propagation loss L from the transmission power $P_{BS}$ (step S102). Since the desired signal level Dup and Ddown are obtained, the base station is ready to start searches. First, a speech communication channel priority i is set to "1" (step S103), and it is checked whether a first priority channel #1 is free (step S104). If the channel #1 is free, a value obtained by subtracting an interference level Uup(1) of the speech communication channel #1 from the level Dup, i.e., the upstream CIR value, is compared with a first level LV1 (step S105).

If the upstream CIR value is equal to or larger than the value of the first level LV1, the base station instructs the mobile station to measure an interference level Udown(1) of the speech communication channel #1, and receives the result from the mobile station (step S106). A value obtained by subtracting the level Udown(1) from the level Ddown, i.e., the downstream CIR value, is then compared with the first level LV1 (step S107). If the downstream CIR value is also equal to or larger than the value of the first level LV1, the speech communication channel #1 is assigned in response to the speech communication request (step S108). If the speech communication channel #1 is currently busy, or the upstream or downstream CIR value of the speech communication channel #1 is less than the value of the first level LV1, the priority i is incremented by one to select a channel #2 corresponding to the second priority (step S110). Subsequently, steps S104 to S107 are repeated in the same manner as described above, thus performing interference condition determination. If such determination is performed with respect to a last speech communication channel #n (step S109) and no usable speech communication can be found, a call loss is determined (step S111).

That is, in the present invention, since there is no need to perform complicated processing, e.g., calculating the average CIR values of all the free channels in a self-zone and another zone and selecting a channel having the minimum average CIR value, speech communication channels are searched in a fixed order. In this case, the frequency use efficiency is improved by setting the same order of selection of speech communication channels in all the cells instead of changing the order of selection in units of cells. The reason for this improvement will be described below. Assume that a total of n speech communication channels exist, and that speech channels with higher priority #1 are preferentially selected in each cell. In such a case, the frequency in use of a speech communication channel is gradually increased from the channel with priority #n to the channel with priority #1. Therefore, even if the interference level of each free speech communication channel is measured in any one of the base or mobile stations, it is observed that the interference level tends to decrease as the channel priority number is increased to #n. In such a state, if selection of the speech communication channels is preferentially started from the speech communication channel #1, a speech communication channel having a smaller margin of the CIR value can be assigned, similar to the flexible reuse scheme.

In addition, according to the present invention, a speech communication channel having a high interference level and a high priority tends to be assigned to a mobile station near a base station because such a mobile station has a sufficiently high carrier level. In contrast to this, a speech communication channel having a low interference level and a low priority tends to be assigned to a mobile station spaced apart from a base station because such a mobile station has a low carrier level. Consequently, the distances between mobile stations and base stations using the same speech communication channel almost coincide with each other so that channels with high priorities are mainly used by mobile stations near base stations, and channels with low priorities are mainly used by mobile stations spaced apart from base stations, thereby realizing efficient channel assignment. In the flexible reuse scheme, since the distances between base stations and mobile stations using the same speech communication channel scarcely coincide with each other, the channels are inefficiently used.

FIG. 2 shows the process of control performed by the base station which executes the channel assignment method of the present invention and, more particularly, an embodiment of channel switching control with respect to a currently used speech communication channel.

Even if a given channel having a CIR value equal to or larger than the value of the first level and providing sufficient signal quality is used at the start of speech communication, when the mobile station travels, the carrier level may be decreased or the interference level may be increased to cause a decrease in CIR value, resulting in a deterioration in signal quality. For this reason, the base station periodically measures the signal qualities of upstream communication lines with respect to all currently used speech communication channels, or causes the mobile stations to measure the signal qualities of the downstream communication lines, and performs the control processing shown in FIG. 2 on the basis of the measurement results. In this case, a signal quality may be based on either a CIR value or a bit error rate.

The base station compares a signal quality Qup of an upstream communication line and a signal quality Qdown of a downstream communication line, both obtained as measurement results, with a second level LV2 (step S200). If both the signal qualities Qup and Qdown are equal to or higher than the second level LV2, the processing is immediately completed. If any one of the signal qualities Qup and Qdown is less than the second level LV2, the reception level of the corresponding speech communication channel is stored as a carrier level Dup (step S201). A value obtained by subtracting the level Dup from transmission power $P_{MS}$ is set as a propagation loss L between the base station and the mobile station (step S202). Since it can be assumed that reversibility is established between upstream and downstream communication lines and the two lines have the same propagation loss L, a downstream carrier level Ddown in the mobile station can be obtained by subtracting the propagation loss L from transmission power $P_{BS}$ (step S203). Following that a speech communication channel priority i is set to "1" (step S204), and it is checked whether a speech communication channel #1 is free (step S205). If the speech communication channel #1 is free, a value obtained by subtracting an interference level Uup(1) of the speech communication channel #1 from the level Dup, i.e., an upstream CIR value, is compared with a third level LV3 (step S206). If the upstream CIR value is equal to or larger than the value of the third level LV3, the base station instructs the mobile station to measure an interference level Udown(1) of the speech communication channel #1, and receives the result from the mobile station (step S207). A value obtained by subtracting the level Udown(1) from the level Ddown, i.e., a downstream CIR value, is then compared with the third level LV3 (step S208). If the downstream CIR value is also equal to or larger than the value of the third level LV3, the currently used speech communication channel is switched to the speech communication #1 (step S209). If the speech communication channel #1 is currently used, or the upstream or downstream CIR value of the speech communication channel #1 is less than the third level LV3, the priority i is incremented by one to select a channel #2 having the second priority (step S211). Subsequently, interference condition determination is performed by repeating steps S205 to S208 in the same manner as described above. If determination is performed with respect to a last speech communication channel #n (step S210) without finding any usable speech communication channel, the processing is immediately completed.

That is, in the present invention, in order to maintain sufficiently high signal quality throughout speech communication, when the signal quality becomes less than the second level as a switching level, the currently used channel is switched to another channel which can ensure a CIR value equal to or larger than the value of the third level. In this channel switching operation, in order to realize channel assignment with high efficiency of frequency use, speech channels are selected in the order of priority common to all the cells. The signal quality of a currently used channel may be represented by a CIR value or a bit error rate. As a method of measuring the CIR value of a currently used speech communication channel, a method using a beat phenomenon is available (Kozono and Ishikawa, "A New Method of Co-Channel D/U Measurement Using Squared Law Envelope Differential Detection", the Institute of Electronics, Information and Communication Engineers, Communication Technical Report, CS83-13, pp. 93–98). In addition, the bit error rate of a currently used speech communication channel can be easily measured by transmitting a bit train having a predetermined pattern through the channel.

Figure 3:
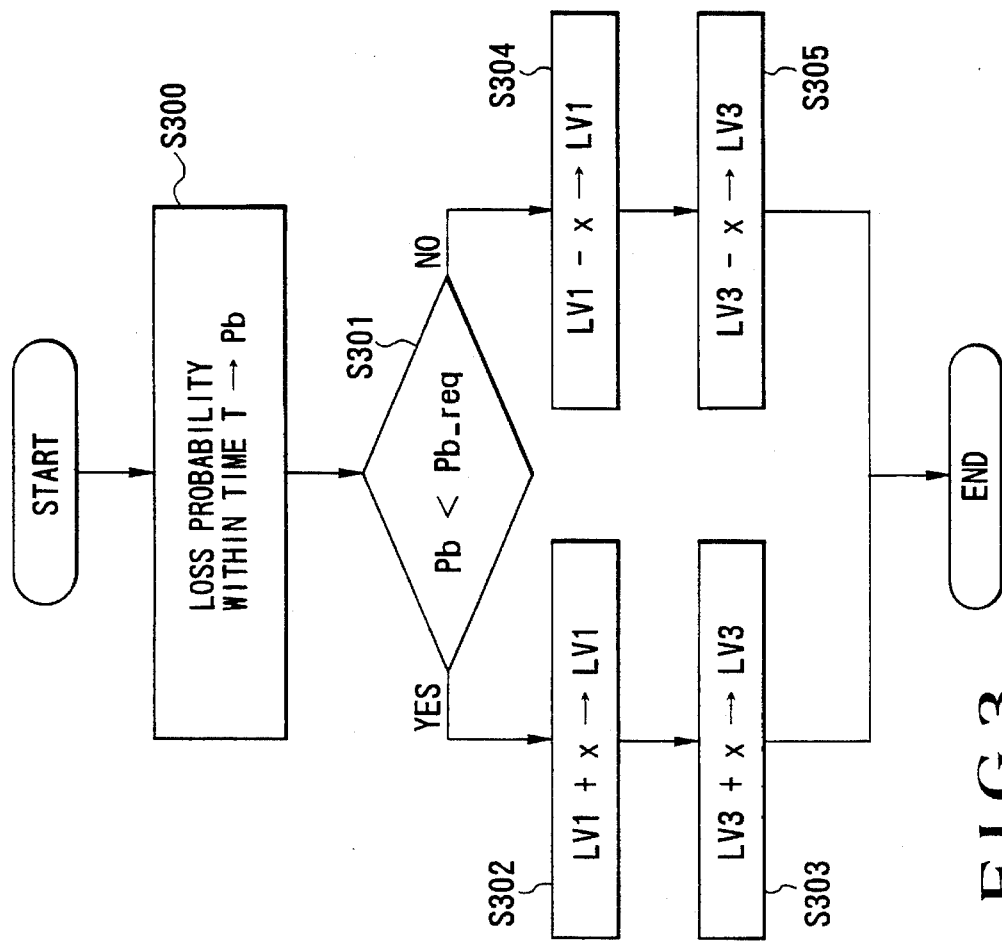
FIG. 3 is a flow chart for explaining the process of control performed by the base station which execute the channel assignment method of the present invention and, more particularly, an embodiment of control processing for updating the first and third levels.

FIG. 3 shows the process of control performed by the base station which executes the channel assignment method of the present invention and, more particularly, an embodiment of control processing for updating the first and third levels. The base station measures a loss probability within a time T at arbitrary time intervals T, i.e., the ratio of the number of speech communication requests resulting in failures to find speech communication channels, i.e., call losses, to the total number of speech communication requests, and sets the measurement result as a loss probability Pb (step S300). The loss probability Pb is compared with a specific value Pb__req (step S301). If the loss probability is less than the specific value Pb__req, first and second levels LV1 and LV3 are increased by a predetermined value x (steps S302 and S303). In contrast to this, if the loss probability Pb is equal to or larger than the specific value Pb__req, the first and third levels LV1 and LV3 are decreased by the predetermined value x (steps S304 and S305). Although the first and third levels LV1 and LV3 are increased and decreased by the same value x in the control processing shown in FIG. 3, the two levels may be increased and decreased by different values. With this control, when the traffic volume is large, the first and third levels LV1 and LV3 are decreased, and vice versa. Therefore, all the speech communication channels can always be used effectively.

More specifically, assume that the first and third levels are fixed. In this case, if the traffic volume is large, all the channels are used. However, if the traffic volume is small, only channels with high priorities are used, and channels with low priorities are not used at all. In this state, even if a sufficient number of channels exist, the signal quality (i.e., the CIR value) is kept to the minimum. Such inefficient use of channels can be prevented by changing predetermined values of the first and third levels. For example, if the traffic volume is small, the first and third levels are increased to use channels with low priorities, thus improving the signal quality. In contrast to this, if the traffic volume is large, the first and third levels are decreased to increase the traffic capacity. In order to perform such control, according to the present invention, a loss probability within a predetermined period of time is measured. If the measurement result is equal to or larger than a specific value, it is determined that the traffic volume is large, and the first and third levels are decreased. If the measurement result is less than the specific value, it is determined that the traffic volume is small, and the first and third levels are increased.

Figure 4:
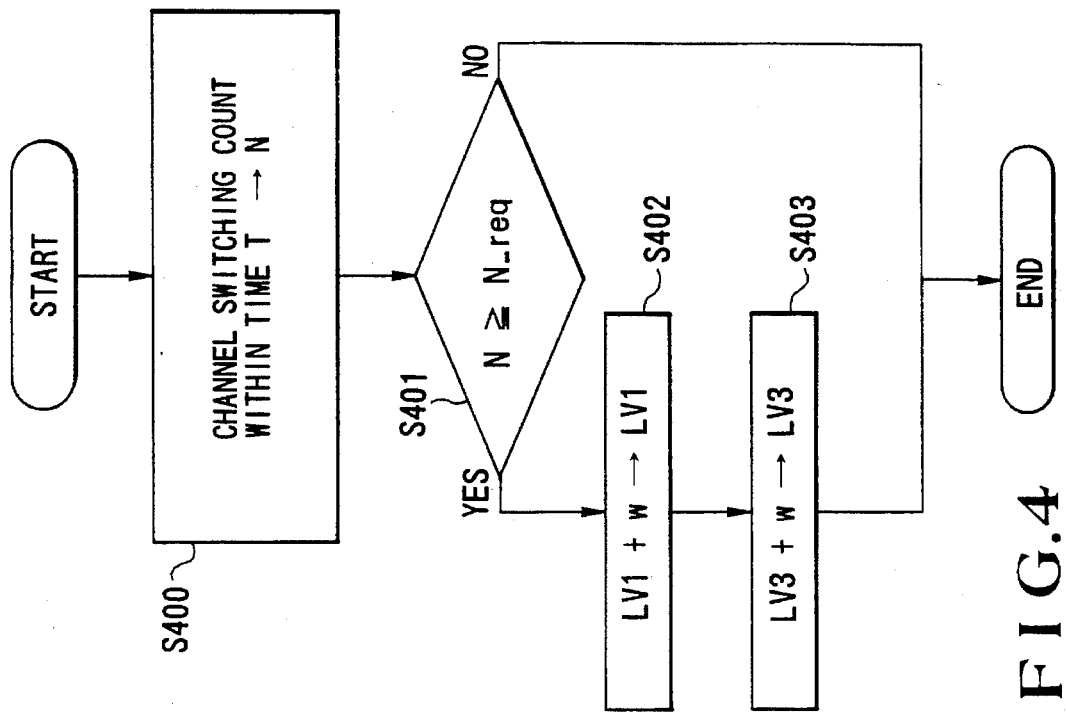
FIG. 4 is a flow chart for explaining the process of control performed by the base station which executes the channel assignment method of the present invention and, more particularly, another embodiment of the control processing for updating the first and third levels.

FIG. 4 shows the process of control performed by the base station which executes the channel assignment method of the present invention and, more particularly, another embodiment of the control processing for updating the first and third levels. The base station measures a channel switching count within a time T at arbitrary time intervals T, and sets the measurement result as a channel switching count N (step S400). The channel switching count N is compared with a specific value N__req (step S401). If the channel switching count N is equal to or larger than the specific value N__req, first and third levels LV1 and LV3 are increased by a predetermined value w (steps S402 and S403). With this control, the channel switching count N can always be limited to a value less than the specific value.

Assume that the control amount x in FIG. 3 is equal to the control amount w in FIG. 4. In this case, if the loss probability is equal to or larger than the specific value, and the channel switching count is equal to or larger than the specific value, the first and third levels are not changed. If the channel switching count needs to be limited to a value less than the specific value even in such a case, the control amount w in FIG. 4 is set to be larger than the control amount x in FIG. 3.

More specifically, if the traffic volume is increased, the first and third levels are decreased to approach the second level at which channel switching is started. As a result, channel switching frequently occurs. However, channel switching is to be performed within a maximum allowable count determined by the processing capacities of the base station apparatus and the exchange. In order to limit the channel switching count to the maximum allowable count or less, according to the present invention, a channel switching count within a predetermined period of time is measured. If the measurement result exceeds the maximum allowable count, the first and third levels are increased.

Figure 5:
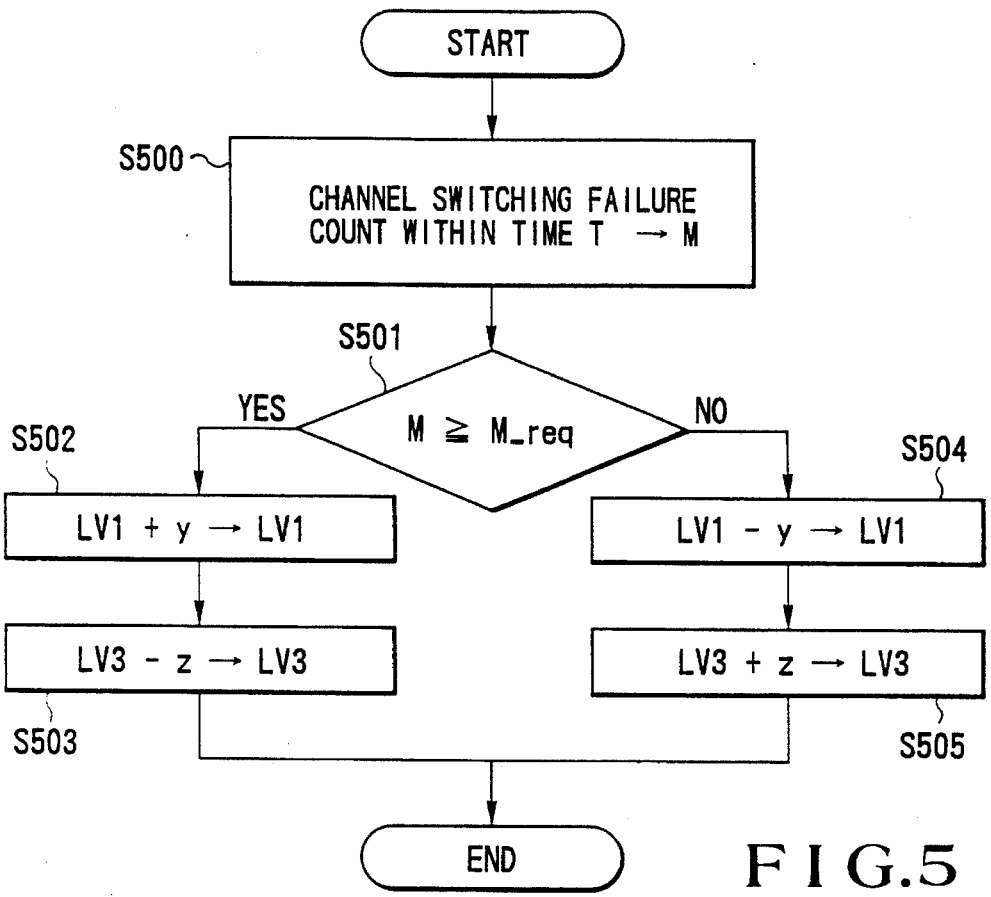
FIG. 5 is a flow chart for explaining the process of control performed by the base station which executes the channel assignment method of the present invention and, more particularly, still another embodiment of the control processing for updating the first and third levels.

FIG. 5 shows the process of control performed by the base station which executes the channel assignment method of the present invention and, more particularly, an embodiment of control processing for updating the first and third levels. The base station measures a channel switching failure count within a time T at arbitrary time intervals T, i.e., the number of times that the signal quality of a currently used speech communication channel becomes less than the second level, and another speech communication channel having a CIR value equal to or larger than the value of the third level cannot be found. The base station then sets the measurement result as a channel switching failure count M (step S500). The channel switching failure count M is compared with a specific value M__req (step S501). If the channel switching failure count M is equal to or larger than the specific value M__req, a first level LV1 is increased by a predetermined value y (step S502), and a third level LV3 is decreased by a predetermined value z (step S503). In contrast to this, if the channel switching failure count M is less than the specific value M__req, the first level LV1 is decreased by the predetermined value y (step S504), and the third level LV3 is increased by the predetermined value z (step S505). Although both the first and third levels LV1 and LV3 are increased and decreased in the control processing shown in FIG. 5, only one of the levels may be increased or decreased. With this control, if a large number of channel switching failures occur, the difference between the first and third levels LV1 and LV3 is increased, and vice versa, thereby keeping the channel switching failure count constant.

More specifically, the design target value of a loss probability with respect to speech communication requests is generally set to be about 1 to 3%, whereas the probability that a call is forcibly disconnected during speech communication due to a channel switching failure (forced release probability) is specified to be a value 1/10 or less the loss probability. Such an application of the present invention can be realized by setting the third level of a CIR value in a channel switching operation to be lower than the first level of a CIR value in a speech communication requesting operation. If, however, the third level is excessively decreased, the channel switching count is increased. In order to adaptively set the difference between the first and third levels, according to the present invention, a channel switching failure count, i.e., the number of times that the signal quality of a currently used speech communication channel becomes less than the second level, and another speech communication channel having a CIR value equal to or larger than the value of the third level cannot be found within a predetermined period of time, is measured. If the measured count is equal to or larger than the specific value of a forced release probability, the difference between the first and third levels is increased. If the count is less than the specific value, the difference between the first and third levels is reduced.

Figure 6:
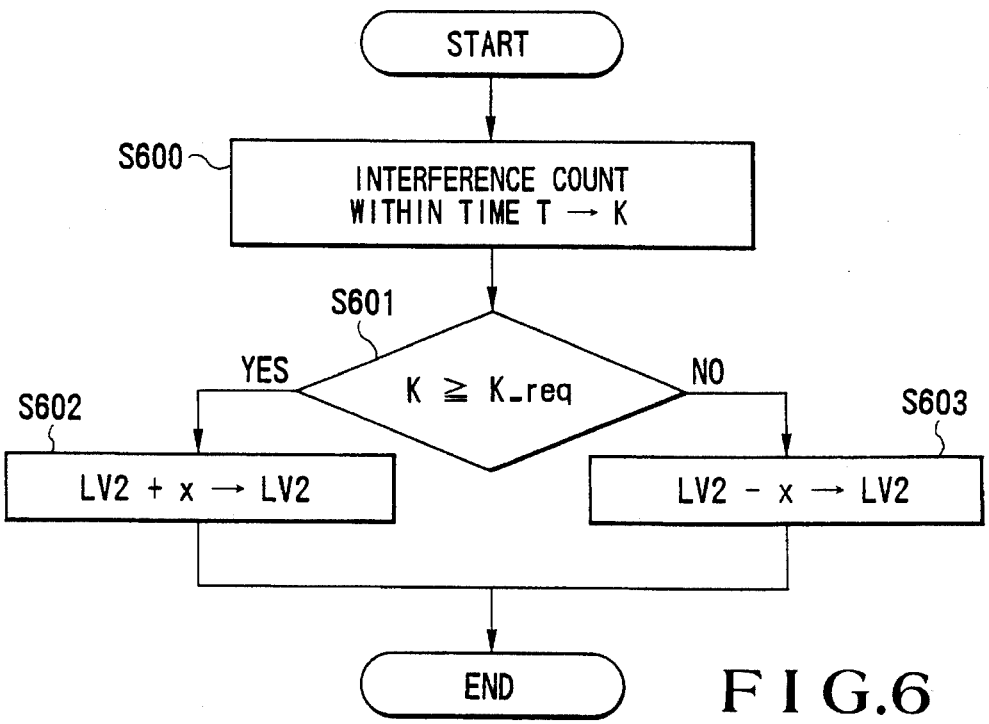
FIG. 6 is a flow chart for explaining the process of control performed by the base station which executes the channel assignment method of the present invention and, more particularly, an embodiment of control processing for updating the second level.

FIG. 6 shows the process of control performed by the base station which executes the channel assignment method of the present invention and, more particularly, an embodiment of control processing for updating the second level. The base station measures an interference count within a time T at arbitrary time intervals T, i.e., the number of times that the signal quality of a currently used speech communication channel becomes less than the minimum allowable level, and sets the measurement result as an interference count K (step S600). The interference count K is compared with a specific value K_req (step S601). If the interference count K is equal to or larger than the specific value K-req, a second level LV2 is increased by a predetermined value x (step S602). In contrast to this, if the interference count K is less than the specific value K_req, the second level LV2 is decreased by the predetermined value x (step S603). With this control, when the interference count is large, the second level LV2 is increased, and vice versa, thus keeping the interference count constant.

More specifically, in order to properly perform speech communication, the signal quality during speech communication must be set at a certain level or more. In order to keep the signal quality at the minimum allowable level or more throughout speech communication, the value of the second level must be set to be larger than the minimum allowable CIR value to advance channel switching. If, however, the second level is excessively increased, the channel switching count is increased. In order to adaptively set the second level, according to the present invention, a signal quality deterioration count, i.e., the number of times that the signal quality of a currently used speech communication channel becomes less than the minimum allowable level within a predetermined period of time, is measured. If the measured count is equal to or larger than the specific value of a signal quality deterioration count, the second level is increased. If the count is less than the specific value, the second level is decreased.

Figure 7:
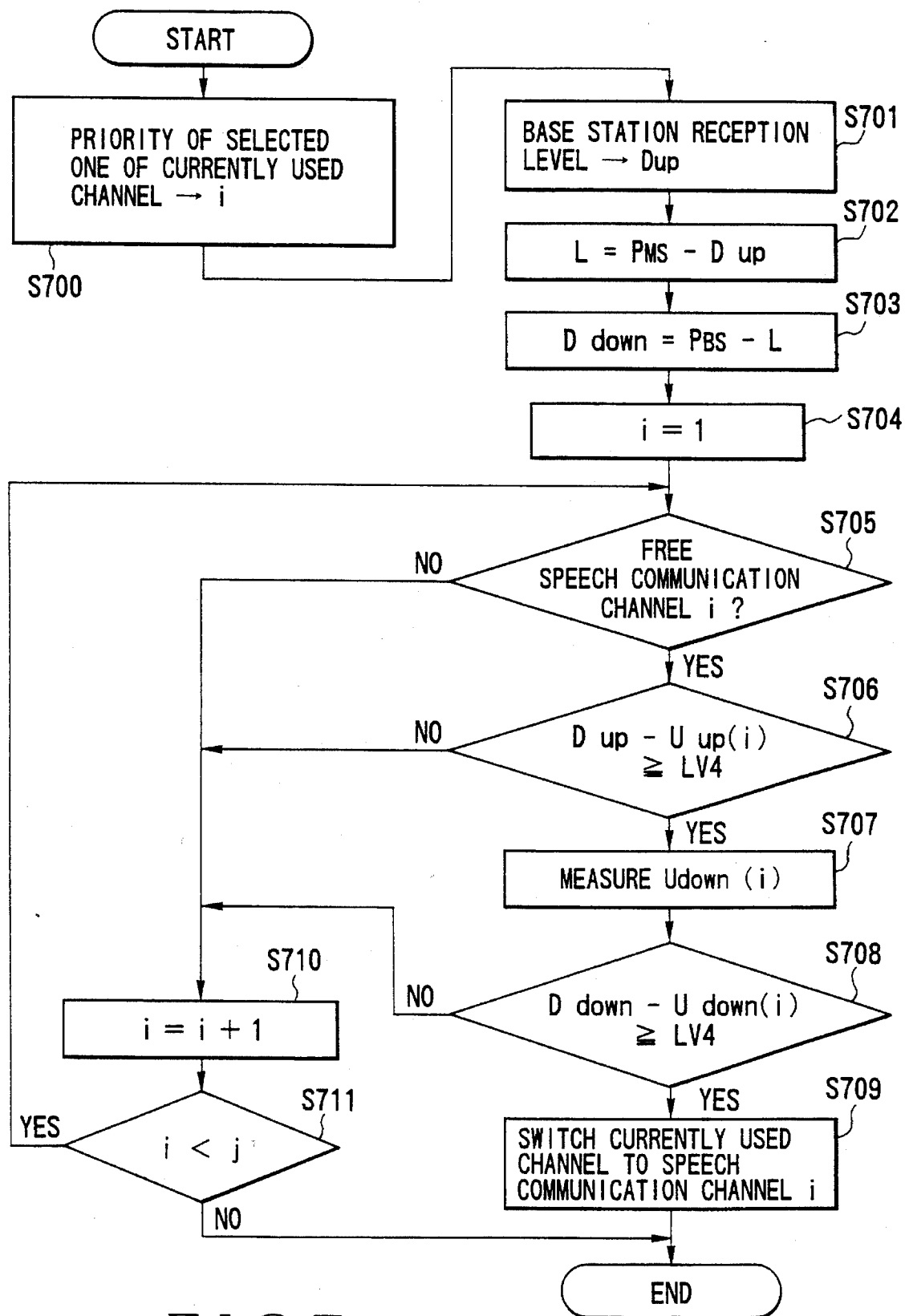
FIG. 7 is a flow chart for explaining the process of control performed by the base station which executes the channel assignment method of the present invention and, more particularly, another embodiment of the channel switching control with respect to a currently used speech communication channel.

FIG. 7 shows the process of control performed by the base station which executes the channel assignment method of the present invention and, more particularly, an embodiment of channel switching control with respect to a currently used speech communication channel.

The base station arbitrarily selects one of currently used speech communication channels, and sets its priority as a priority i (step S700). An upstream carrier level Dup is then stored (step S700). A value obtained by subtracting the level Dup from transmission power $P_{MS}$ is set as a propagation loss L between the base station and the mobile station (step S702). Since it can be assumed that reversibility is established between upstream and downstream communication lines and the two lines have the same propagation loss L, a downstream carrier level Ddown in the mobile station can be obtained by subtracting the propagation loss L from transmission power $P_{BS}$ (step S703). Following that a speech communication channel priority i is set to "1" (step S704), and it is checked whether a speech communication channel #1 is free (step S705). If the speech communication channel #1 is free, a value obtained by subtracting an interference level Uup(1) of the speech communication channel #1 from the level Dup, i.e., an upstream CIR value, is compared with a fourth level LV4 (step S706). If the upstream CIR value is equal to or larger than the value of the fourth level LV4, the base station instructs the mobile station to measure an interference level Udown(1) of the speech communication channel #1, and receives the result from the mobile station (step S707). A value obtained by subtracting the level Udown(1) from the level Ddown, i.e., a downstream CIR value, is then compared with the fourth level LV4 (step S708). If the downstream CIR value is also equal to or larger than the value of the fourth level LV4, the selected speech communication channel is switched to the speech communication #1 (step S709), and the processing is completed. If the speech communication channel #1 is currently used, and the upstream or downstream CIR value of the speech communication channel #1 is less than the fourth level LV4, the priority i is incremented by one to select a channel #2 having the second priority (step S710). Subsequently, the priority i of the speech communication channel as a switching designation candidate selected in step S710 is compared with the priority i of the currently used speech communication channel selected in step S700 (step S711). If the priority i of the speech communication channel as the switching destination candidate is lower than the priority i of the currently used speech communication channel, steps S705 to S708 are repeated to check whether channel switching can be performed. If the priority i of the speech communication channel as the switching designation candidate becomes equal to the priority i of the currently used speech communication channel, the control processing is completed.

More specifically, in order to switch a currently used speech communication channel to a free speech communication channel having a higher priority when such a high-priority channel becomes free upon completion of speech communication or channel switching to an adjacent base station, according to the present invention, the base station arbitrarily selects a currently used speech communication, and checks whether the selected channel can be switched to a speech communication having a higher priority. Similar to the processing for a speech communication request, the base station selects free speech communication channels in the order of priority common to a plurality of cells. If a selected free channel has a priority higher than that of the currently used speech communication channel and also has a CIR value equal to or larger than the value of the fourth level, channel switching is performed.

In the control processing shown in FIG. 7, the base station selects currently used speech communication channels in an arbitrary order. However, in the control processing shown in FIGS. 8 and 9 to be described below, the order of selection of currently used speech communication channels is specified.

FIG. 8 shows still another embodiment of the control processing performed by the base station which executes the channel assignment method of the present invention.

The base station starts the control processing shown in FIG. 8 at arbitrary time intervals T. The base station measures the upstream carrier levels of all currently used speech communication channels (step S800). A parameter n for identifying a speech communication channel is set to be "1" (step S801). A currently used speech communication channel having an nth highest upstream carrier level Dup is selected as a channel to be switched (step S802). The control processing described with reference to FIG. 7 is performed to check whether the selected currently used speech communication channel can be switched to a speech communication channel having a higher priority (step S803). When the control processing shown in FIG. 7 is completed, the parameter n is incremented by one to select a currently used speech communication channel having the next highest upstream carrier level Dup (step S804). It is checked whether the control processing for all the currently used speech communication channels is completed (step S805). If the processing is completed, the control processing is ended. If the processing is not completed, steps S802 to S804 are repeated.

More specifically, in channel switching to a speech communication channel having a higher priority, a speech communication channel having a higher priority is preferably assigned to a mobile station closer to the base station. The distances from the base station to the mobile stations have a strong correlation with the upstream carrier reception levels and the order of priority of currently used speech communication channels. That is, a mobile station nearer to the base station tends to have a higher upstream carrier reception level, and the currently used speech communication channel tends to have a higher priority. For this reason, in the present invention, the base station measures the upstream carrier reception levels of all the currently used speech communication channels at an arbitrary timing, and checks whether the current used speech communication channel having a high reception level can be switched to a speech communication channel having a higher priority.

Figure 9:
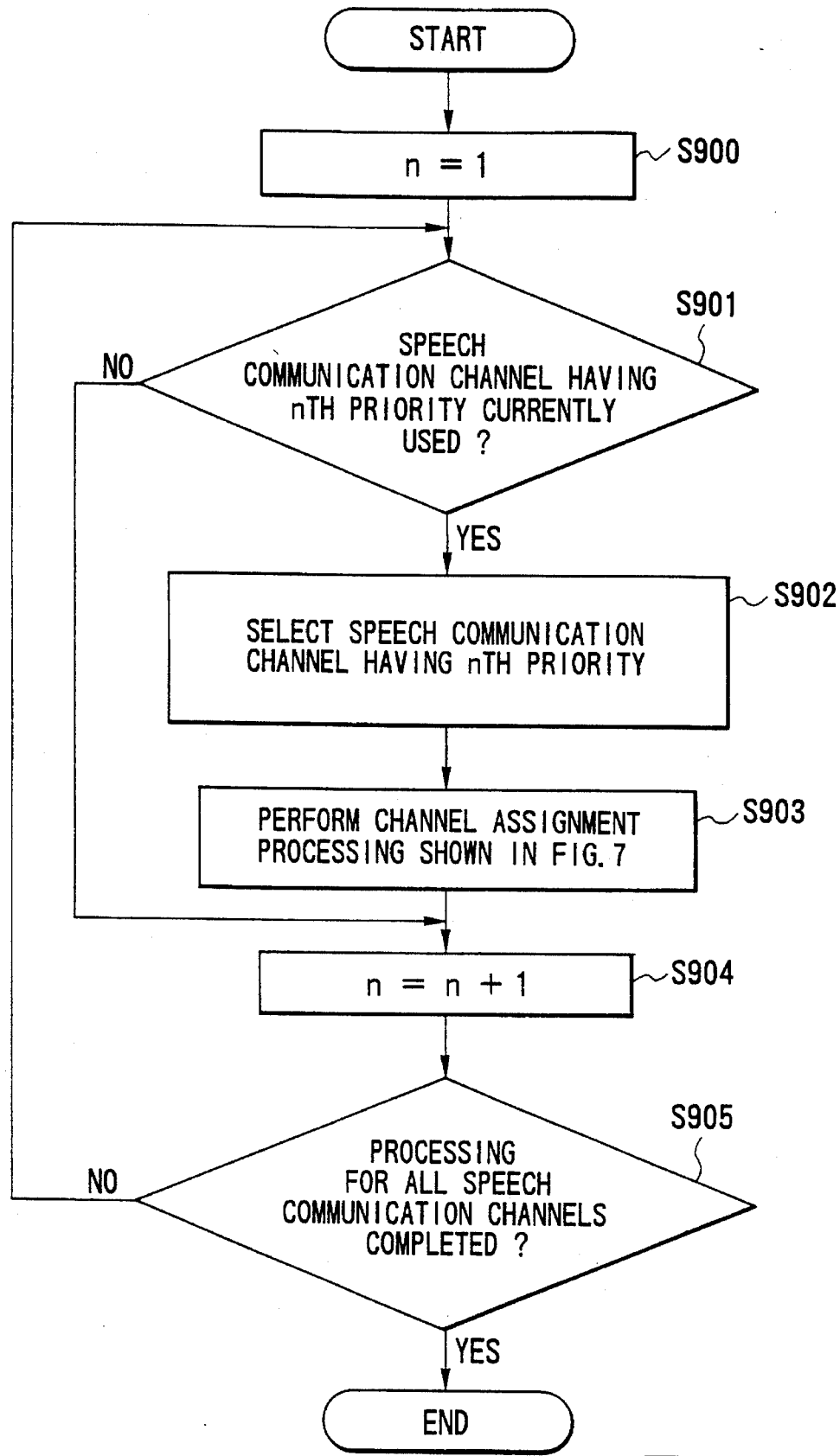
FIG. 9 is a flow chart for explaining still another embodiment of the control processing performed by the base station which executes the channel assignment method of the present invention.

FIG. 9 shows still another embodiment of the control processing performed by the base station which executes the channel assignment method of the present invention.

The base station starts the control processing shown in FIG. 9 at arbitrary time intervals T. The base station sets a parameter n for identifying a speech communication channel to be "1" (step S900). It is then checked whether a speech communication having an nth priority is currently used (step S901). If the nth speech communication channel is currently used, the speech communication channel having the nth priority is selected as a channel to be switched (step S902). The control processing described with reference to FIG. 7 is performed to check whether the selected currently used speech communication channel can be switched to a speech communication channel having a higher priority (step S903). If the control processing shown in FIG. 7 is completed, or the nth speech communication channel is free, the parameter n is incremented by one to select a speech communication having the next highest priority (step S904). It is checked whether the control processing for all the currently used speech communication channels is completed (step S905). If the processing is completed, the control processing is ended. If the processing is not completed, steps S901 to S904 are repeated.

That is, according to the present invention, the base station checks whether a currently used speech communication channel having a high priority can be switched to a speech communication channel having a higher priority at an arbitrary timing.

Figure 10:
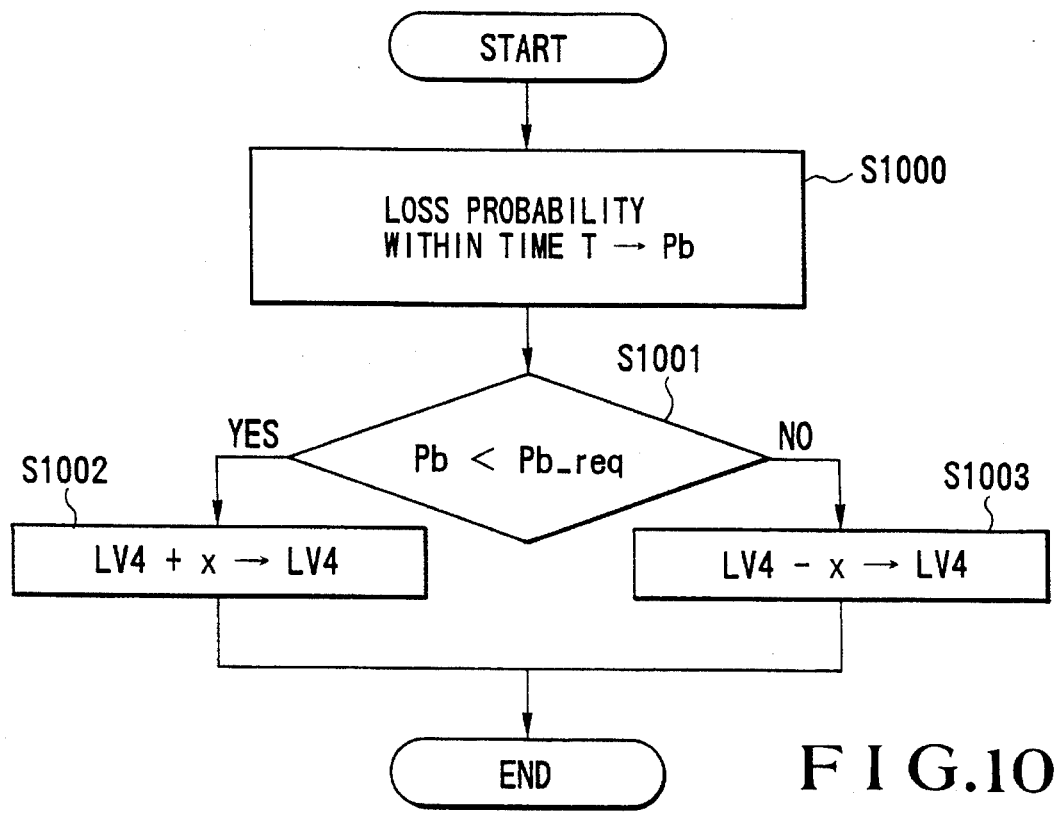
FIG. 10 is a flow chart for explaining the process of control performed by the base station which executes the channel assignment method of the present invention and, more particularly, an embodiment of control processing for updating the fourth level.

FIG. 10 shows the process of control performed by the base station which executes the channel assignment method of the present invention and, more particularly, an embodiment of control processing for updating the fourth level. The base station measures a loss probability within a time T at arbitrary time intervals T, i.e., the ratio of the number of speech communication requests resulting in failures to find speech communication channels, i.e., call losses, to the total number of speech communication requests, and sets the measurement result as a loss probability Pb (step S1000). The loss probability Pb is compared with a specific value Pb_req (step S1001). If the loss probability Pb is less than the specific value Pb_req, a fourth level LV4 is increased by a predetermined value x (step S1002). In contrast to this, if the loss probability Pb is equal to or larger than the specific value Pb_req, the fourth level LV4 is decreased by the predetermined value x (step S1003). In the control processing shown in FIG. 10, the fourth level LV4 is increased and decreased by the same value x. However, the level may be increased and decreased by different values. With this control, when the traffic volume is large, the fourth level LV4 is decreased, and vice versa. Therefore, all the speech communication channels can always be used effectively.

That is, if the traffic volume is small, the fourth level is increased to improve the signal quality, whereas if the traffic volume is large, the fourth level is decreased to increase the traffic capacity. In order to perform such control, according to the present invention, a loss probability within a predetermined period of time is measured. If the measurement result is equal to or larger than a specific value, it is determined that the traffic volume is large, and the fourth level is decreased. In contrast to this, if the measurement result is less than the specific value, it is determined that the traffic volume is small, and the fourth level is increased.

Figure 11:
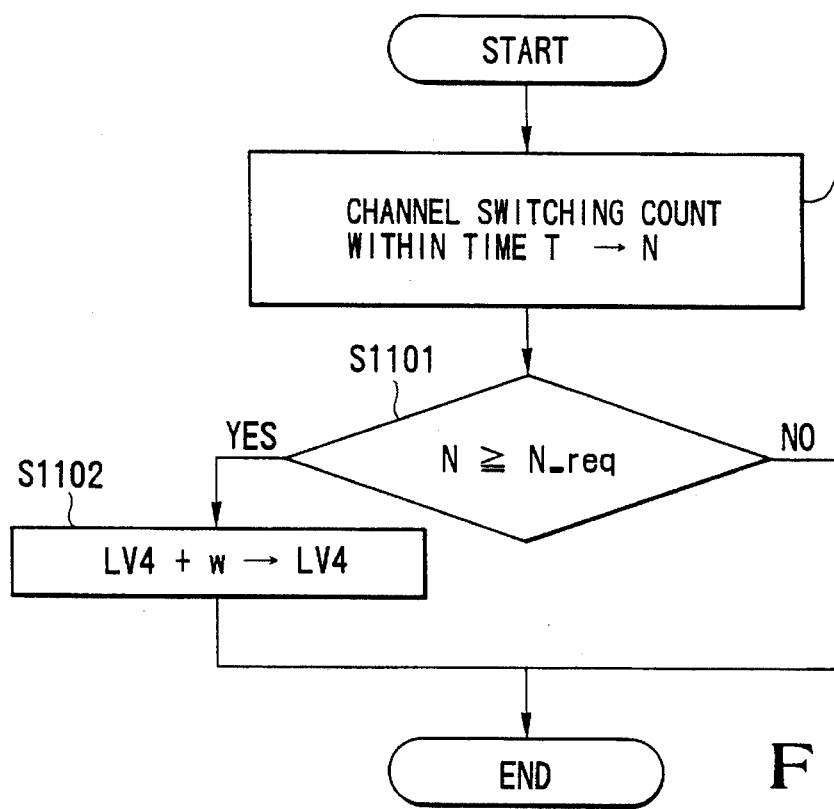
FIG. 11 is a flow chart for explaining the process of control performed by the base station which executes the channel assignment method of the present invention and, more particularly, another embodiment of the control processing for updating the fourth level.

FIG. 11 shows the process of control performed by the base station which executes the channel assignment method of the present invention and, more particularly, another embodiment of the control processing for updating the fourth level. The base station measures a channel switching count within a time T at arbitrary time intervals T, and sets the measurement result as a channel switching count N (step S1100). The channel switching count N is compared with a specific value N_req (step S1101). If the channel switching count N is equal to or larger than the specific value N_req, a fourth level LV4 is increased by a predetermined value w (step S1102). With this control, the channel switching count N can always be limited to a value smaller than the specific value.

Assume that the control amount x in FIG. 10 is equal to the control amount w in FIG. 11. In this case, if the loss probability Pb is equal to or larger than the specific value, and the channel switching count N is equal to or larger than the specific value, the fourth level is not changed. Even in such a case, if the channel switching count needs to be limited to a value smaller than the specific value, the control value w in FIG. 11 is set to be larger than the control value x in FIG. 10.

More specifically, if the traffic volume is increased, the fourth level is decreased to approach the second level at which channel switching is started. As a result, channel switching is frequently performed. In order to limit the channel switching count to the maximum allowable value or less, according to the present invention, a channel switching count within a predetermined period of time is measured. If the measurement result exceeds the maximum allowable count, the fourth level is increased.

In a mobile station, e.g., a portable terminal, which frequently performs communication while it is stopped or moved at a relatively low speed, the carrier level and the interference level scarcely change. Even if a channel having the minimum CIR value is assigned to such a mobile station, a deterioration in signal quality hardly occurs. In contrast to this, in a mobile station, e.g., a vehicle mounted terminal, which frequency performs communication while it is moved at high speed, the carrier level and the interference level rapidly change. If a channel having the minimum CIR value is assigned to such a mobile station, the probability of degradation in signal quality is very high. Therefore, in order to prevent a deterioration in signal quality, a channel having the minimum CIR value is assigned to only the former type of mobile station to improve the frequency use efficiency, while a channel having a sufficiently large CIR value is assigned to the latter type of mobile station. FIGS. 12 to 18 show embodiments for such a case.

Figure 12:
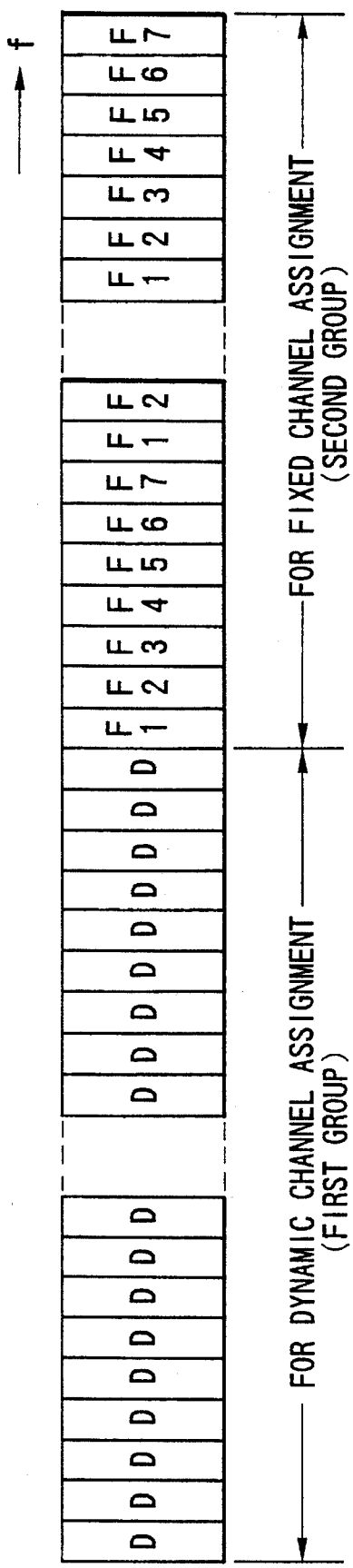
FIG. 12 is a view showing an arrangement of radio speech communication channels on the frequency axis which are assigned by the channel assignment method of the present invention.
Figure 13:
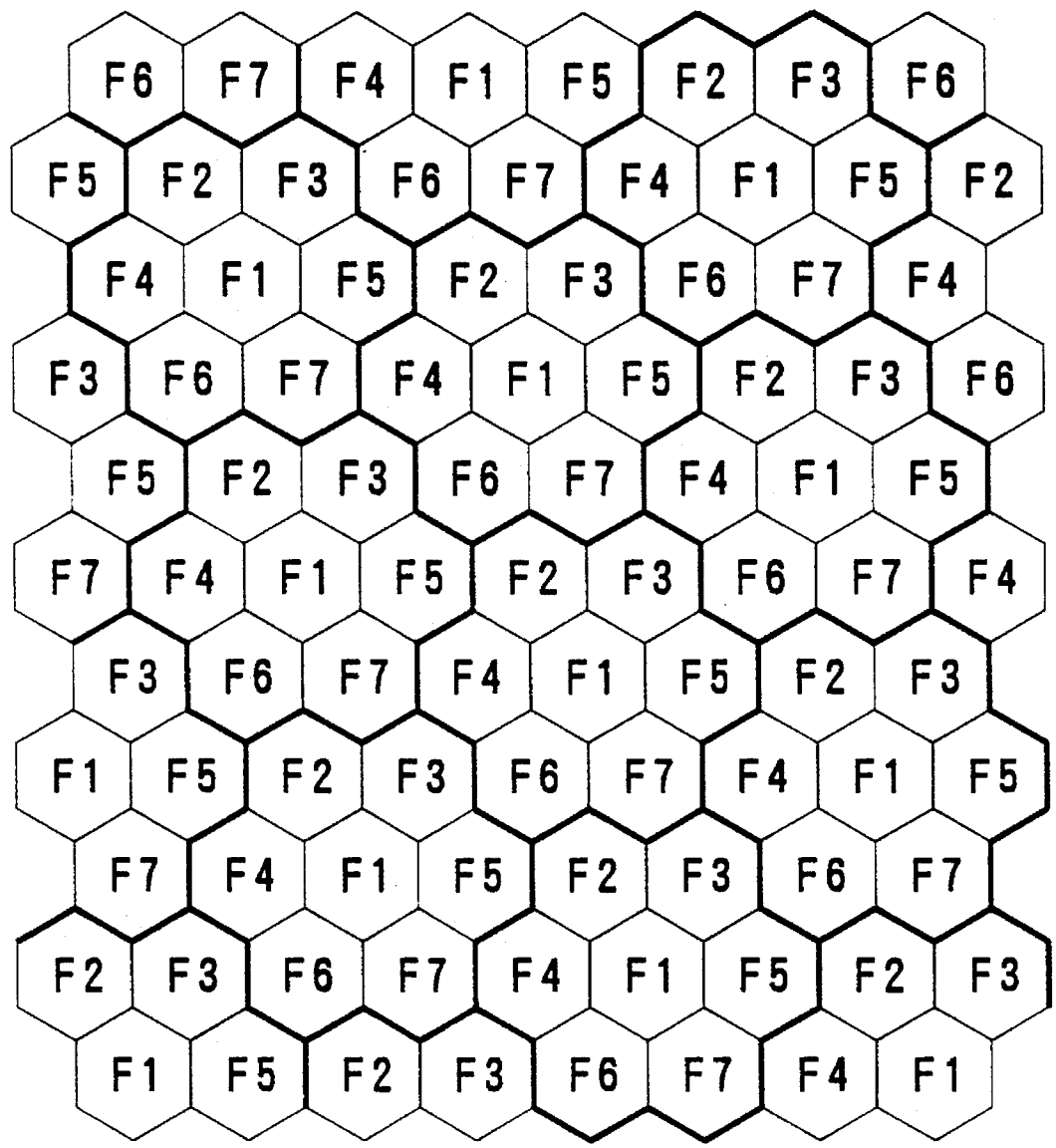
FIG. 13 is a view showing an arrangement of radio speech communication channels in base stations which are assigned by the channel assignment method of the present invention.

FIG. 12 shows the arrangement of radio speech communication channels on the frequency axis, which are assigned by the channel assignment method of the present invention. All the channels assigned to the system are classified into the first and second groups. The first group is assigned to dynamic channel assignment, whereas the second group is assigned to fixed channel assignment. Referring to FIG. 12, the second group is further divided into seven subgroups F1 to F7. Each base station can use arbitrary channels of the first group and channels belonging to a predetermined subgroup of the second group. FIG. 13 shows an arrangement of the subgroups of the second group which are respectively assigned to base stations. Referring to FIG. 13, each hexagon indicates a cell, and the subgroups F1 to F7 are respectively arranged in the base stations located in the centers of the respective cells. In this case, the repetition count (cluster size) is 7.

Figure 14:
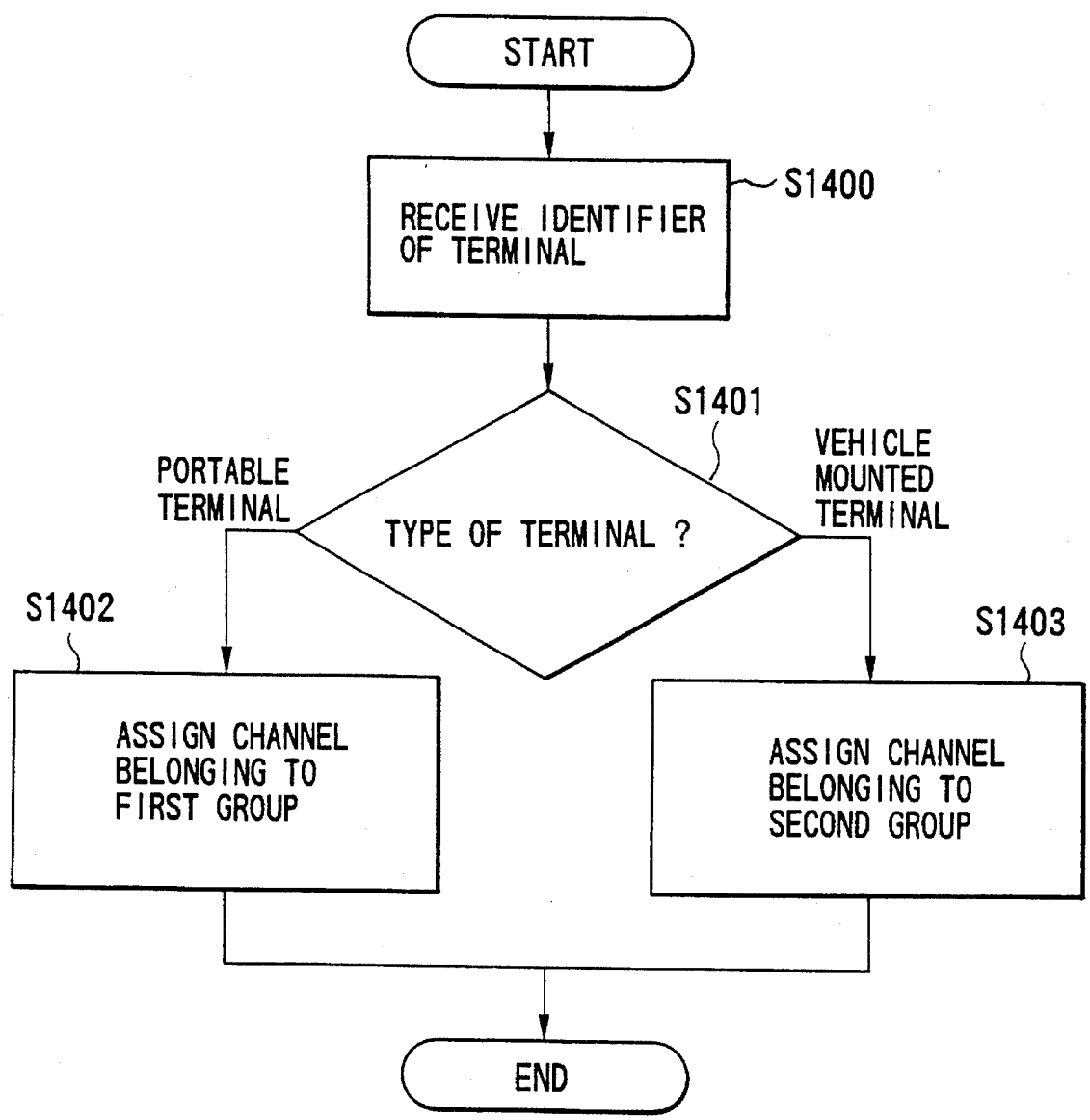
FIG. 14 is a flow chart for explaining the process of control performed by the base station which executes the channel assignment method of the present invention and, more particularly, another embodiment of the channel assignment control with respect to a speech communication request.

FIG. 14 shows the process of control performed by the base station which executes the channel assignment method of the present invention and, more particularly, another embodiment of the channel assignment control with respect to speech communication requests. Assume that the base station is allowed to use the channels belonging to the first group and the channels belonging to the subgroup F1 of the second group in FIG. 12, and that the identifier of each mobile station includes an identification bit indicating whether the mobile station is a portable unit or a vehicle mounted unit. When a speech communication request for a mobile station outgoing call or a mobile station incoming call is generated, the base station requests and receives the identifier of a mobile station associated with the speech communication request from the exchange or the mobile station (step S1400). Subsequently, the base station checks on the basis of the identification bit included in the mobile station identifier and indicating the type of mobile station whether the mobile station is a portable unit or a vehicle mounted unit (step S1401). If the mobile station is a portable unit, the base station selects a proper channel from the channels belonging to the first group and assigns it to the mobile station (step S1402).

In this case, as an algorithm for channel selection, a scheme for assigning channels having CIR values as small as possible, such as in the conventional flexible reuse scheme, or a scheme for assigning channels at random can be used. If the mobile station is a vehicle mounted unit, the base station selects a proper channel from the channels belonging to the subgroup F1 of the second group, and assigns it to the mobile station (step S1403). Since the channels of the second group are fixedly assigned so as not cause interference, any orders of assignment do not make much difference.

That is, in the present invention, all the radio speech communication channels assigned to the system are classified into the first and second groups. The first group is used for dynamic channel assignment, whereas the second group is used for fixed channel assignment. The second group is further divided into subgroups equal in number to a repetition count (cluster size). Each base station is allowed to use all the channels belonging to the first group and the radio speech communication channels belonging to one subgroup in the second group. Since all the base stations can use the channels belonging to the first group, no guarantee about the CIR values of the channels is provided. In contrast to this, since the channels belonging to the second group can be used by only base stations spaced apart from corresponding mobile stations by a predetermined distance or more, the CIR value of each channel belonging to the second group is guaranteed in advance to be a certain value or more.

In a general automobile telephone system, it can be determined from the identifier of a mobile station whether the mobile station is a portable terminal or a vehicle mounted terminal. In this case, each base station decodes identifier acknowledged from mobile stations, and assigns channels belonging to the first group to portable terminals while assigning channels belonging to the second group to vehicle mounted terminals.

Figure 15:
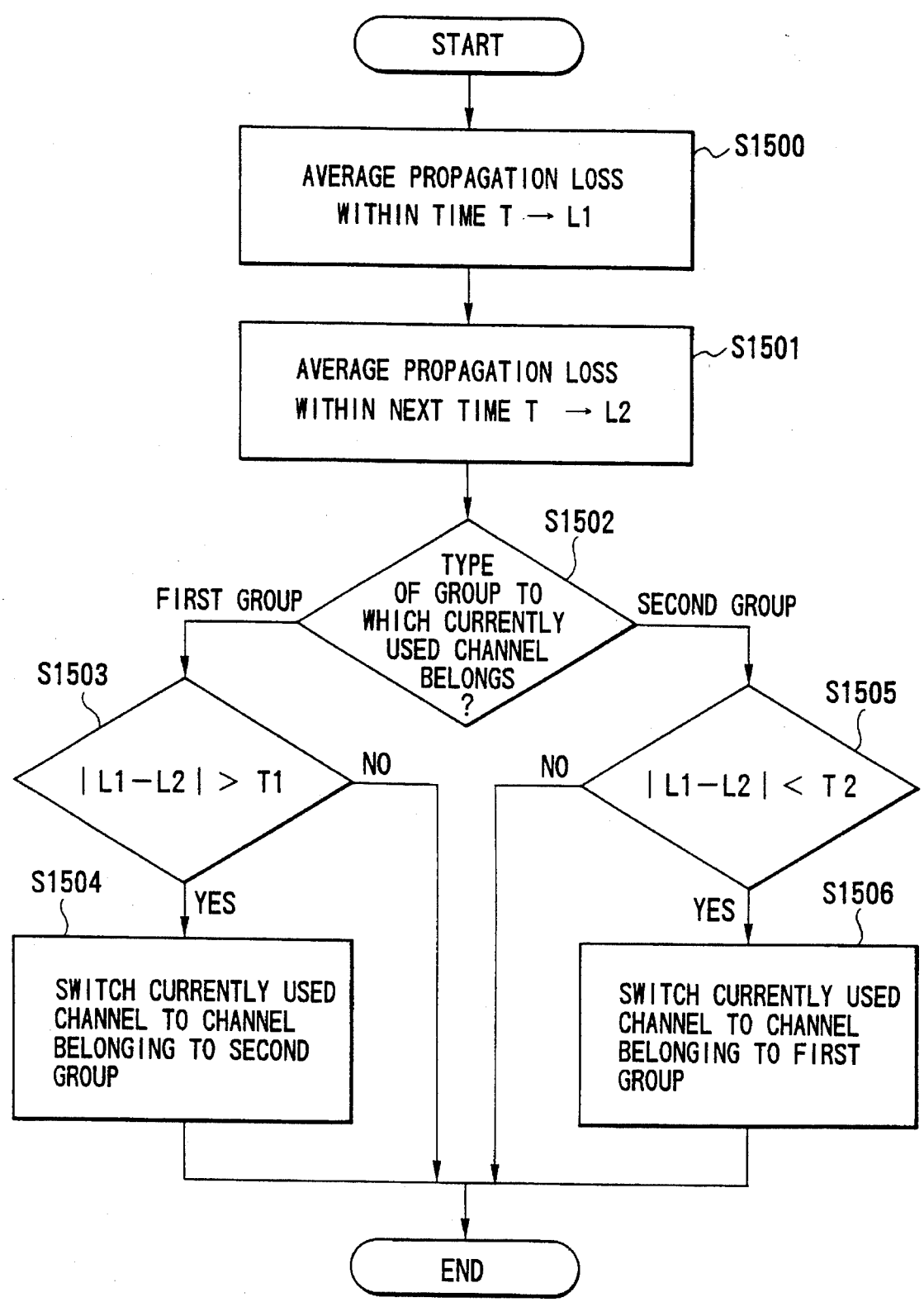
FIG. 15 is a flow chart for explaining the process of control performed by the base station which executes the channel assignment method of the present invention and, more particularly, still another embodiment of channel assignment control with respect to a currently busy mobile station.

FIG. 15 shows still another embodiment of the present invention. FIG. 15 shows the process of control performed by the base station which executes the channel assignment method of the present invention and, more particularly, channel assignment control with respect to a currently busy mobile station. Assume that the base station is allowed to use the channels belonging to the first group and the channels belonging to the subgroup F1 of the second group in FIG. 12, and that each mobile station of this system periodically reports current transmission power and a current transmission power control amount to the base station. The control processing shown in FIG. 15 is periodically performed with respect to a currently busy mobile station. The base station averages the propagation losses between the currently busy mobile station and the self-station over a predetermined time T, and sets the average value as a value L1 (step S1500). The base station further averages the propagation losses between the currently busy mobile station and the self-station over the next predetermined time T, and sets the average value as a value L2 (step S1501). As described above, a propagation loss without transmission power control is calculated as follows:

[propagation loss]=[transmission power of mobile station]−[reception level of base station]

A propagation loss with transmission power control is calculated as follows:

[propagation loss]=[transmission power of mobile station]+[transmission power control amount in mobile station]−[reception level of base station]

Subsequently, the base station checks which group the channel currently used by the currently busy mobile station belongs to (step S1502). If the channel belongs to the first group, the absolute value of the difference (|L1−L2|) between the average values L1 and L2 is calculated and is compared with a threshold value T1 (step S1503). If the absolute value of the difference between the average values L1 and L2 exceeds the threshold value T1, the base station instructs the mobile station to switch the currently used channel to a free channel belonging to the second group (step S1504). If the absolute value of the difference between the average values L1 and L2 is equal or smaller than the threshold value T1, no processing is performed. If it is determined in step S1502 that the currently used channel belongs to the second group, the absolute value of the difference (|L1–L2|) between the average values L1 and L2 is calculated and compared with a threshold value T2 (step S1505). If the absolute value of the difference between the average values L1 and L2 is less than the threshold value T2, the base station instructs the mobile station to switch the currently used channel to a free channel belonging to the first group (step S1506). If the absolute value of the difference between the average values L1 and L2 is equal to or larger than the threshold value, no processing is performed. A channel group to be used may be determined on the basis of the variance of a plurality of measurement values of average propagation losses instead of the difference between average propagation losses in this embodiment.

More specifically, when a portable terminal is to be used in a vehicle in a traveling state, a channel belonging to the first group is assigned to the terminal according to the above-described method, and a deterioration in signal quality may be caused. In addition, when a vehicle mounted terminal is to be used in a vehicle which stops due to traffic jam, a channel belonging to the second group is assigned to the terminal according to the above-described method, even though a channel belonging to the first group can be assigned. In order to solve this problem, according to the present invention, an average propagation loss between a base station and each mobile station within a predetermined period of time is measured. With this operation, the base station assigns a channel belonging to the first group to a mobile station in which the amount of change in average propagation loss is small, and assigns a channel belonging to the second group to a mobile station in which the amount of change in average propagation loss is large.

Figure 16:
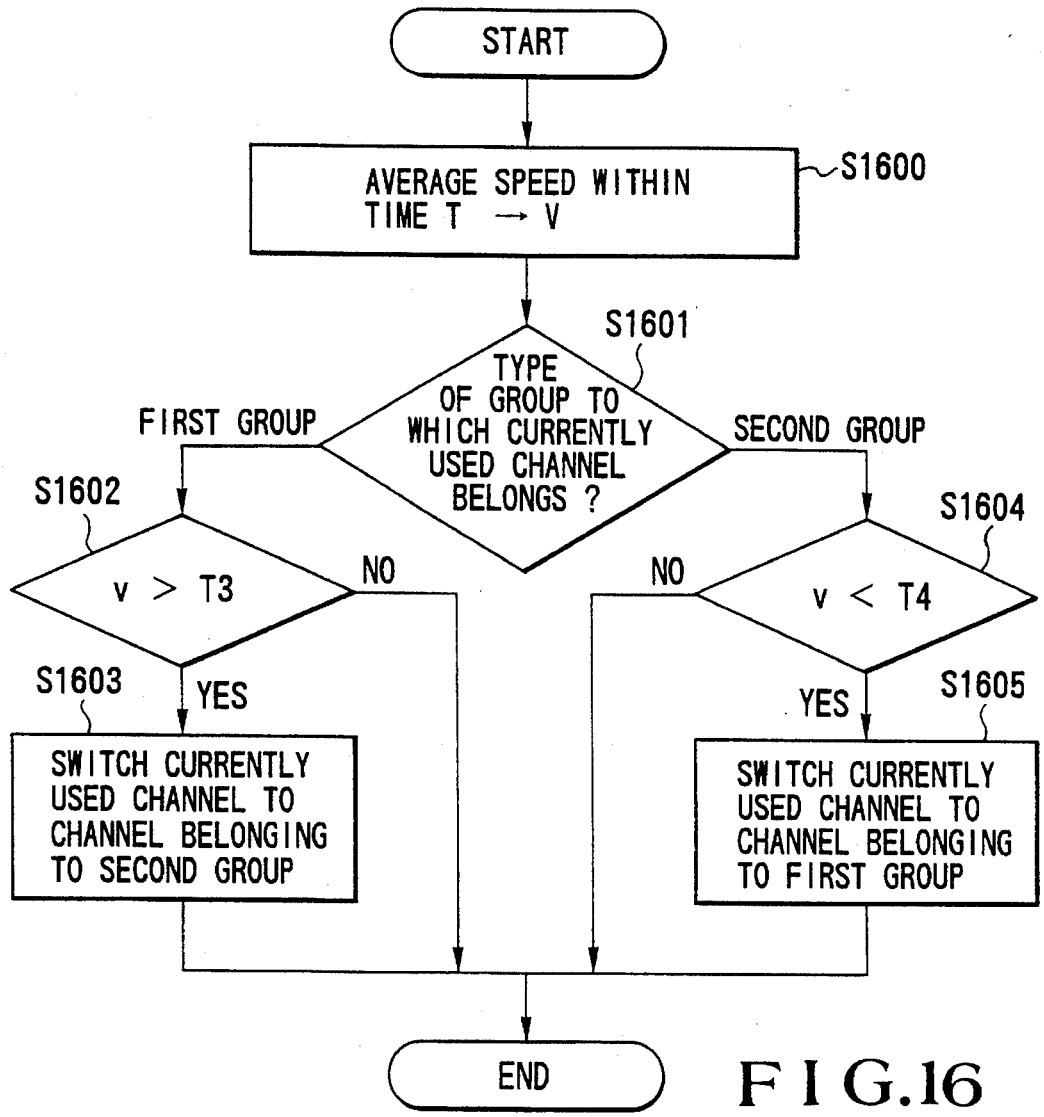
FIG. 16 is a flow chart for explaining the process of control performed by the base station which executes the channel assignment method of the present invention and, more particularly, another embodiment of the channel assignment control with respect to a currently busy mobile station.

FIG. 16 shows the process of control performed by the base station which executes the channel assignment method of the present invention and, more particularly, another embodiment of the channel assignment control with respect to a currently busy mobile station. Assume that this base station is allowed to use the channels belonging to the first group and the channels belonging to the subgroup F1 in the second group in FIG. 12, and that the base station in this system can detect the traveling speed of a mobile station. The control processing shown in FIG. 16 is periodically performed with respect to a currently busy mobile station. The base station averages the traveling speed of the currently busy mobile station over a predetermined time T, and sets the average value as a traveling speed v (step S1600). Subsequently, the base station checks which group the channel currently used by the currently busy mobile station belongs to (step S1601). If the currently used channel belongs to the first group, the traveling speed v is compared with a threshold value T3 (step S1602). If the traveling speed v exceeds the threshold value T3, the base station instructs the mobile station to switch the currently used channel to a free channel belonging to the second group (step S1603). If the value of the traveling speed v is equal to or smaller than the threshold value T3, no processing is performed. If it is determined in step 1601 that the currently used channel belongs to the second group, the traveling speed v is compared with a threshold value T4 (step S1604). If the traveling speed v is less than the threshold value T4, the base station instructs the base station to switch the currently used channel to a free channel belonging to the first group (step S1605). If the value of the traveling speed v is equal to or larger than the threshold value T4, no processing is performed.

That is, instead of measuring the amount of change in average propagation loss, the traveling speed of each mobile station may be measured so that a channel belonging to the first group is assigned to a mobile station traveling at low speed, and a channel belonging to the second group is assigned to a mobile station traveling at high speed. As a method of allowing a base station to detect the traveling speed of each mobile station, a method using variations in reception level due to fading is available. In this method, a level crossing count, i.e., the number of times that the reception level crosses a certain threshold value, is measured to estimate a traveling speed (Syuji Yasuda, Yoshiaki Nakajima, Seizo Onoe, "Mobile Communication Channel Assignment Control Method", Japanese Patent Laid-Open No. 3-104329).

As described above, according to the present invention, dynamic channel assignment is performed with respect to a portable terminal, a mobile station in which the amount of change in propagation loss is small, or a mobile station which travels at low speed, whereas fixed channel assignment is performed with respect to a vehicle mounted terminal, a mobile station in which the amount of change in propagation loss is larger, or a mobile station which travels at high speed, thereby providing a channel assignment method in which the high efficiency of frequency use is high, and a deterioration in signal quality is small.

Figure 17:
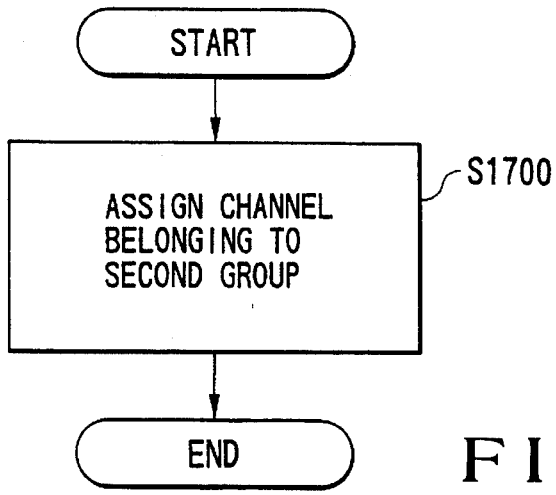
FIG. 17 is a flow chart for explaining still another embodiment of the control processing performed by the base station which executes the channel assignment method of the present invention.

FIG. 17 shows still another embodiment of the control processing performed by the base station which executes the channel assignment method of the present invention. Assume that this base station is allowed to use the channels belonging to the first group and the channels belonging to the subgroup F1 in the second group in FIG. 12. When a speech communication request for a mobile station outgoing call or a mobile station incoming call is generated, the base station unconditionally assigns a free channel belonging to the subgroup F1 in the second group to a corresponding mobile station regardless of the identifier of the mobile station, the amount of change in propagation loss, and the traveling speed of the mobile station (step S1700).

More specifically, if a channel group is to be determined by detecting the traveling speed of a mobile station or the amount of change in propagation loss between the mobile station and the base station, the time interval between the instant at which the mobile station generates a speech communication request and the instant at which speech communication is started is considerably prolonged. For this reason, in the present invention, a channel belonging to the second group is unconditionally assigned in response to a new speech communication request to shorten the connection time. The traveling speed of the mobile station or the propagation loss between the mobile station and the base station may be detected after channel assignment. In this case, if a channel belonging to the first group can be assigned, channel switching may be performed.

Figure 18:
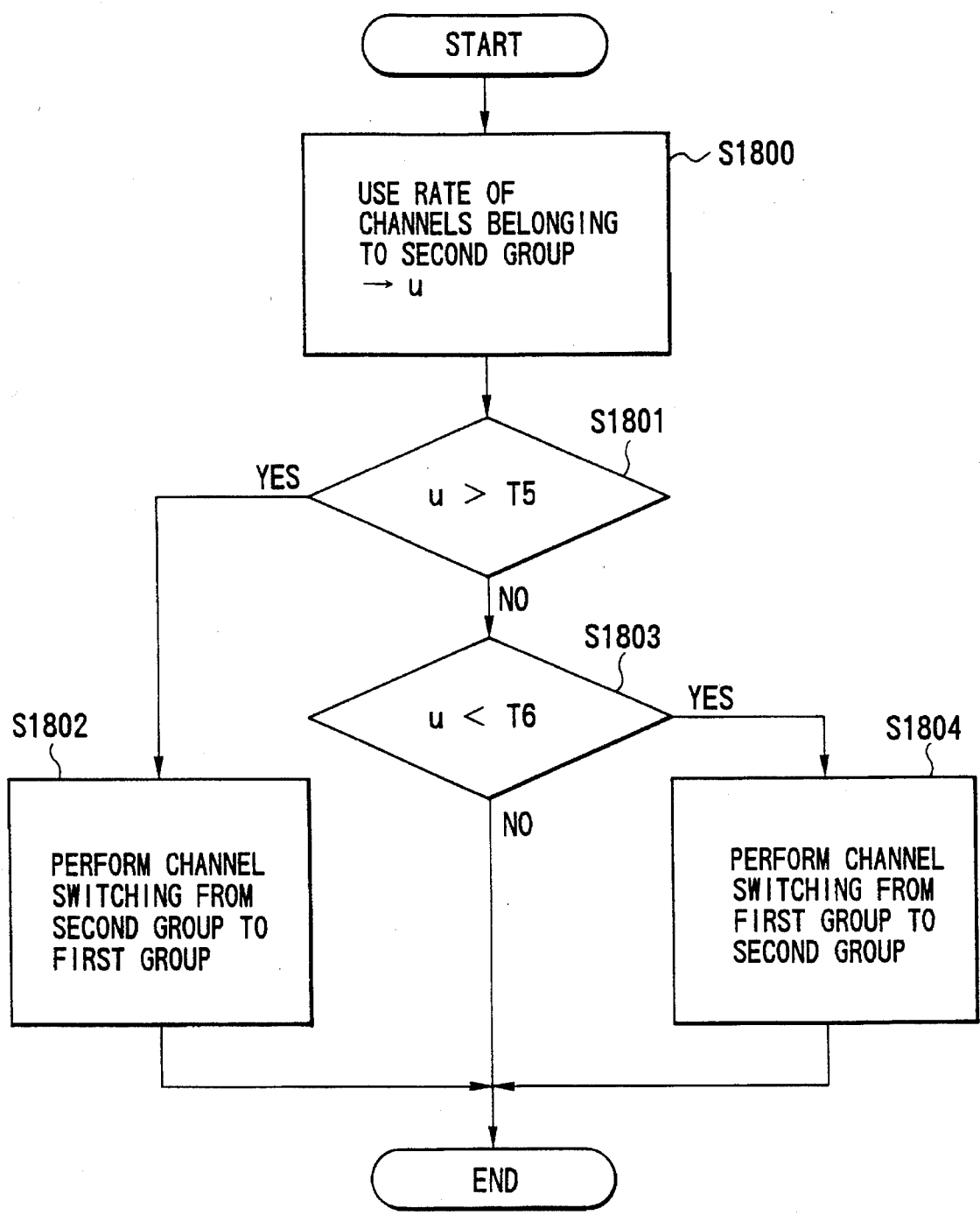
FIG. 18 is a flow chart for explaining still another embodiment of the control processing performed by the base station which executes the channel assignment method of the present invention.

FIG. 18 shows still another embodiment of the control processing performed by the base station which executes the channel assignment method of the present invention. Assume that this base station is allowed to use the channels belonging to the first group and the channels belonging to the subgroup F1 in the second group in FIG. 12. The base station measures the rate at which the channels belonging to the subgroup F1 in the second group are used, and sets the measurement result as a channel use rate u (step S1800). Subsequently, the base station compares the channel use rate u with a threshold value T5 (step S1801). If the channel use rate u exceeds the threshold value T5, the base station selects a mobile station currently using a channel belonging to the second group, and instructs the mobile station to switch the channel to a free channel belonging to the first group (step S1802). Although the criterion for selecting a mobile station can be arbitrarily set, it is preferable that a mobile station having a small amount of change in average propagation loss or a low average traveling speed be preferentially selected. In step S1802, instead of immediately instructing channel switching, the channel use rate u may be decreased by increasing the threshold values T3 and T4 in FIG. 16. If it is determined in step S1801 that the channel use rate u exceeds the threshold value T5, the base station compares the channel use rate u with a threshold value T6 (step S1803). If the channel use rate u is less than the threshold value T6, the base station selects a mobile station currently using a channel belonging to the first group, and instructs the mobile station to switch the currently used channel to a free channel belonging to the second group (step S1804). Although the criterion for selecting a mobile station can be arbitrarily set, it is preferable that a mobile station having a large amount of change in average propagation loss or a high average traveling speed be preferentially selected. In step S1804, instead of immediately instructing channel switching, the channel use rate u may be increased by decreasing the threshold values T1 and T2 in FIG. 15 and the threshold values T3 and T4 in FIG. 16. If it is determined in step S1803 that the value of the channel use rate u is equal to or larger than the threshold value T6, the base station completes the control processing without performing any processing.

More specifically, as described above, when a channel belonging to the second group is to be preferentially assigned in response to a speech communication request, if all the channels belonging to the second group are currently used, the new speech communication request results in a call loss. In order to reduce loss probabilities, it is preferable that a constant number of free channels be always ensured in the channels belonging to the second group. A state in which the channels belonging to the second group are scarcely used is not preferable in terms of effective use of frequencies, either. In the present invention, the use rate of the radio speech communication channels belonging to one subgroup in the second group is monitored. If the use rate exceeds a certain value (A), the use rate is decreased by performing channel switching from channels belonging to the second group to channels belonging to the first group. If the use rate is less than a certain value (B), the use rate is increased by performing channel switching from channels belonging to the first group to channels belonging to the second group. With such control, the use rate of the channels belonging to the second group can be kept almost constant (a value between A and B).

Furthermore, in the method shown in FIG. 1, a third-order intermodulation wave is produced at the carrier frequency of a speech communication channel used by a mobile station spaced apart from the base station and having a low priority, depending on the manner of determining the order of selection of channels, owing to an interaction with a speech communication channel used by a mobile station near the base station and having a high priority. Therefore, the interference level of each speech communication channel having a low priority is increased, and the distances between base stations and mobile stations using the same speech communication channel tend to vary, hindering an improvement in efficiency of channel assignment.

FIGS. 19A to 19D respectively show the orders of selection of speech communication channels, in the channel assignment method of the present invention, which are determined to improve the efficiency of channel assignment.

The orders of selection of speech communication channels are determined in the following manner.

In the first example, a speech communication channel to be selected first, i.e., a speech communication channel having a priority #1, is arbitrarily determined. In the example shown in FIG. 19A, the priority #1 is given to a channel $f_4$. A priority #2 is given to a channel $f_3$ or $f_5$ which differs least in carrier frequency from the channel $f_4$ having the priority #1. If a plurality of speech communication channels differ in carrier frequency from the channel $f_4$ to the same degree, a higher priority can be given to any one of the channels. In this case, the channel $f_3$ has the priority #2. A priority #3 is given to the channel $f_5$ which differs in carrier frequency from the channel $f_4$ to the same degree as the channel $f_3$. Subsequently, in the same manner as described above, priorities #4 and #5 are given to channels $f_2$ and $f_6$ which differ least in carrier frequency from the channel $f_4$, of the channels except for the channels $f_3$ to $f_5$; priorities #6 and #7, channels $f_1$ and $f_7$; a priority #8, a channel $f_8$; a priority #9, a channel $f_9$; and a priority #10, a channel $f_{10}$.

In the second example, a speech communication channel having the maximum carrier frequency is set as a channel having the first priority. In the example shown in FIG. 19B, a channel $f_{10}$ has a priority #1. A priority #2 is given to a channel $f_9$ which differs least in carrier frequency from the channel $f_{10}$. A priority #3 is given to a channel $f_8$ which differs least in carrier frequency from the channel $f_{10}$, next to the channel $f_9$. Subsequently, in the same manner as described above, the respective priories are determined, and a priority #10 is given to a channel $f_1$.

In the third example, a speech communication channel having the minimum carrier frequency is set as a channel having the first priority. In the example shown in FIG. 19C, a priority #1 is given to a channel $f_1$. A priority #2 is given to a channel $f_2$ which differs least in carrier frequency from the channel $f_1$. A priority #3 is given to a channel $f_3$ which differs least in carrier frequency from the channel $f_1$, next to the channel $f_2$. Subsequently, in the same manner as described above, the respective priories are determined, and a priority #10 is given to a channel $f_{10}$.

In the fourth example, the priorities of speech communication channels are sequentially determined in the order of decreasing frequency difference from the central value of the carrier frequencies of all the speech communication channels. As in the example shown in FIG. 19D, if all the speech communication channels are denoted by $f_1, f_2, \ldots, f_{10}$, the central value of the carrier frequencies is given by $(f_1+f_{10})/2$. The channels $f_1$ and $f_{10}$ differ most in carrier frequency from the central value. If two speech communication channels differ from the central value to the same degree, the first priority can be given to either of the two channels. In the example shown in FIG. 19D, a priority #1 is given to the channel $f_1$. Therefore, a priority #2 is given to the channel $f_{10}$. Since the channels $f_2$ and $f_9$ differ most in carrier frequency from the central value, next to the channels $f_1$ and $f_{10}$, priorities #3 and #4 are respectively given to these channels. Subsequently, in the same manner as described above, the respective priorities are determined, and priorities #9 and #10 are respectively given to the channels $f_5$ and $f_6$.

Figure 19A:
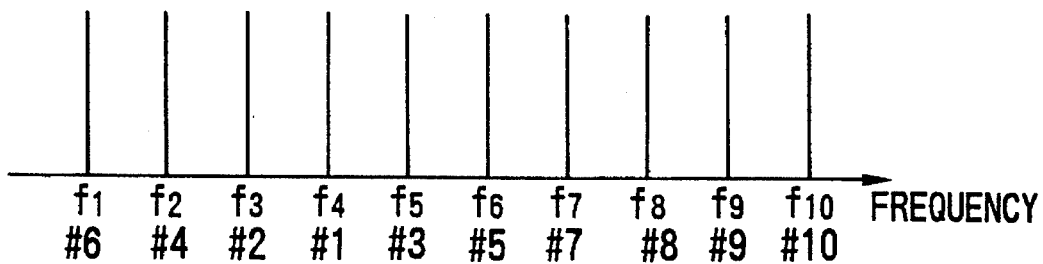
FIGS. 19A to 19D are views respectively showing the orders of selection of speech communication channels in the channel assignment method of the present invention.

If speech communication channels are selected in the order shown in FIG. 19A, the channels $f_4$ and $f_3$ having the priorities #1 and #2 are used near the base station. Third-order intermodulation caused by these two frequencies is represented by $2f_3-f_4=f_2$ and $2f_4-f_3=f_5$. Since the channels $f_2$ and $f_5$ respectively have the priorities #4 and #3, i.e., high priories, and are frequently used relatively near the base station, the channels have high carrier and interference levels and are not easily influenced by intermodulation.

Figure 19B:
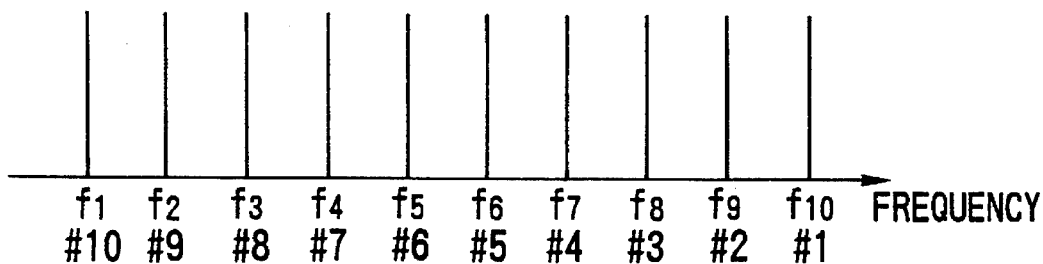

Similarly, if speech communication channels are selected in the order shown in FIG. 19B, the channels $f_{10}$ and $f_9$ having the priorities #1 and #2 are used near the base station. Third-order intermodulation caused by these two frequencies is represented by $2f_9 - f_{10} = f_8$. Since the channel $f_8$ has the priority #3, i.e., a high priority, and is frequency used relatively near the base station, both the carrier and interference levels are high, and speech communication is not easily influenced by the intermodulation.

Figure 19C:
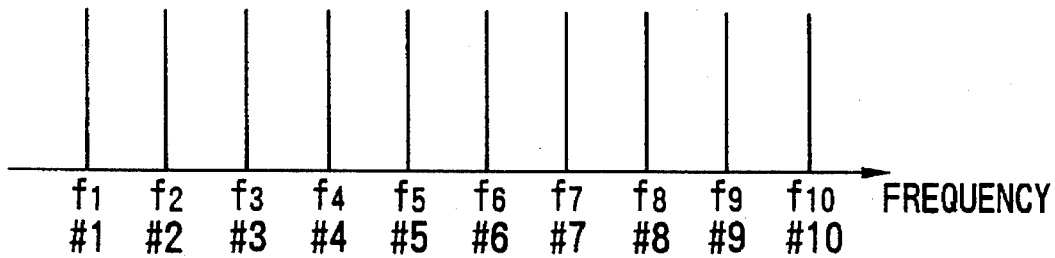

Similarly, if speech communication channels are selected in the order shown in FIG. 19C, the channels $f_1$ and $f_2$ having the priorities #1 and #2 are used near the base station. Third-order intermodulation caused by these two frequencies is represented by $2f_2 - f_1 = f_3$. Since the channel $f_3$ has the priority #3, i.e., a high priority, and is frequency used relatively near the base station, both the carrier and interference levels are high, and speech communication is not easily influenced by the intermodulation.

Figure 19D:
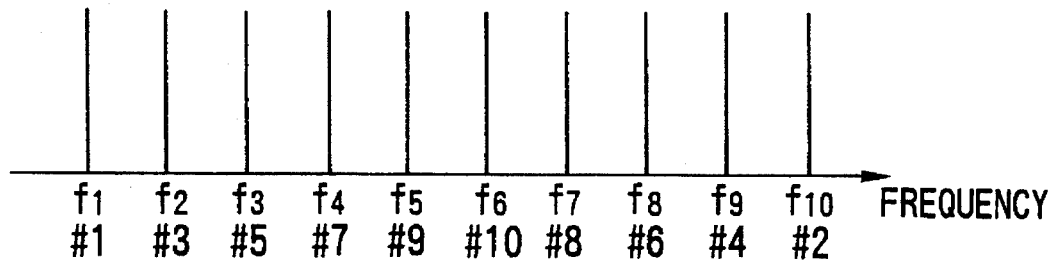

Furthermore, if speech communication channels are selected in the order shown in FIG. 19D, the channels $f_1$ and $f_{10}$ having the priorities #1 and #2 are used near the base station. Third-order intermodulation caused by the channels $f_1$ and $f_{10}$ is represented by $2f_0 - f_1 > f_{10}$, i.e., a channel located outside the range of speech communication channels. Therefore, speech communication is not easily influenced by the third-order intermodulation. In addition, third-order intermodulation caused by the three channels $f_1$, $f_{10}$ and $f_2$ respectively having the priorities #1, #2, and #3 is represented by $f_1 + f_{10} - f_2 = f_9$. Since the channel $f_9$ has the priority #4, i.e., a high priority, and is frequently used relatively near the base station, both the carrier and interference levels are high, and speech communication is not easily influenced by the intermodulation.

If, therefore, a speech communication channel selection order is determined by these methods, channel assignment with high efficiency of frequency use can be realized by the above-described scheme without being much influenced by intermodulation.

Although the present invention has been described in detail with reference to the particular embodiments, the present invention is not limited these embodiments. For example, in the embodiments, the FDMA (Frequency Division Multiple Access) scheme is exemplified. However, the embodiments can be carried out by using the TDMA (Time Division Multiple Access) scheme without posing any problem.

Figure 20B:
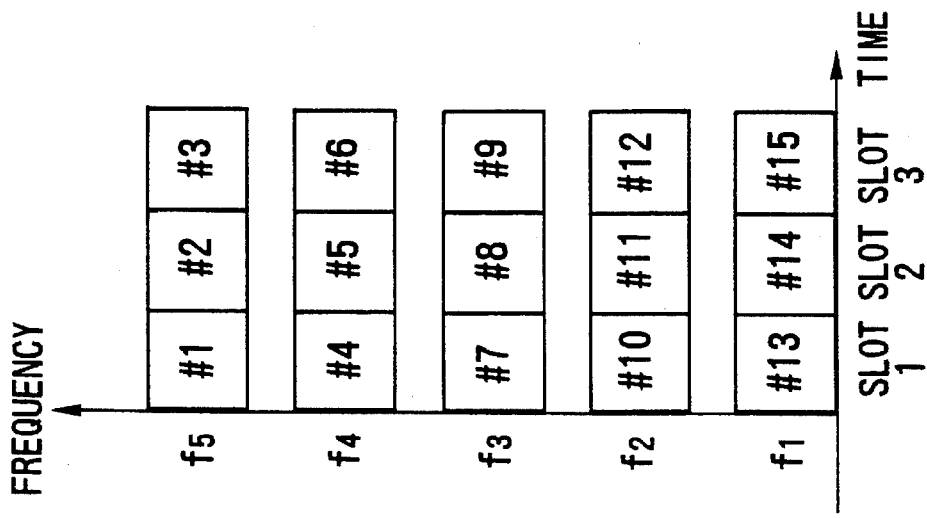
FIGS. 20A and 20B are views respectively showing the orders of selection of speech communication channels in the multi-carrier type TDMA scheme according to the present invention.
Figure 20A:
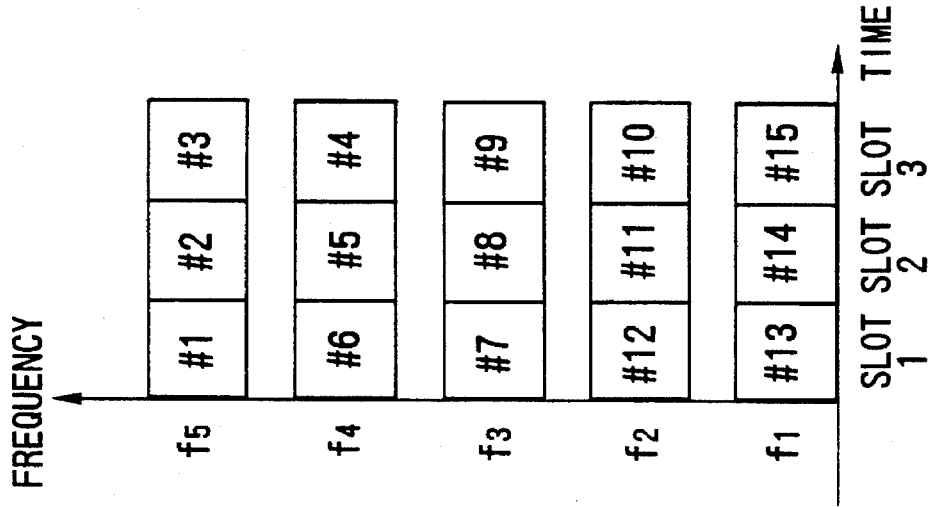

FIGS. 20A and 20B show cases wherein five carrier frequencies are used in the three-channel TDMA scheme. In the present invention, if the first priority is given to a carrier frequency $f_5$, the subsequent priorities are sequentially given to frequencies $f_4$, $f_3$, $f_2$, and $f_1$ in this order. Three speech communication channels on the same carrier frequency have no carrier frequency difference, their priorities can be arbitrarily set. FIG. 20A shows a speech communication selection order in which the priorities of slot 1, slot 2, and slot 3 on each carrier frequency are sequentially decreased in the order named. FIG. 20B shows a speech communication channel selection order in which the priorities of the three slots on the respective adjacent carrier frequencies are changed in opposite directions.

As has been described in detail above, according to the present invention, there is provided a channel assignment method which can achieve high efficiency of frequency use with simple control processing while suppressing a deterioration in signal quality due to interference without being easily influenced by third-order intermodulation.

What is claimed is:

1. A channel assignment method for a mobile communication system, comprising the steps of:

selecting one of all idle speech communication channels in accordance with a predetermined fixed priority of the channels which is set in the same order in each of a plurality of base stations respectively arranged in a plurality of cells constituting a service area, in response to a speech communication request from a mobile station;

determining whether or not a carrier to interference ratio of the selected speech communication channel is greater than or equal to a first level; and assigning the selected channel as a speech communication channel for the cell when it is determined on the basis of the result of said determining step that the carrier to interference ratio is greater than or equal to the first level, and wherein the step of selecting one of all idle speech communication channels includes a step of repeatedly selecting one of the remaining idle speech communication channels with the next priority when it is determined that the carrier to interference ratio of the selected channel is less than the first level.

2. A method according to claim 1, wherein the step of assigning the channel includes the step of assigning a speech communication channel when both upstream and downstream carrier to interference ratios are greater than or equal to the first level.

3. A method according to claim 1, wherein each of the plurality of cells selects first the same speech communication channel which is arbitrarily set, and sequentially selects speech communication channels in an order to decrease a difference in carrier frequency from a carrier frequency of the speech communication channel selected first.

4. A method according to claim 1, wherein each of the plurality of base stations sequentially selects speech communication channels in the predetermined fixed priority of the channels to increase a difference in carrier frequency from the selected speech communication channel.

5. A method according to claim 4, wherein the same speech communication channel which is selected is a speech communication channel having the highest carrier frequency.

6. A method according to claim 4, wherein the same speech communication channel which is selected is a speech communication channel having the lowest carrier frequency.

7. A channel assignment method for a mobile communication system, comprising the steps of:

causing each of a plurality of base stations respectively arranged in a plurality of cells constituting a service area to select, in response to a speech communication request from a mobile station, one of all speech communication channels in an order of priority common to all the cells;

causing the base station to check whether a carrier to interference ratio of the selected speech communication channel is greater than or equal to a first level;

assigning the channel as a speech communication channel for the cell when it is determined on the basis of the check result that the carrier to interference ratio is greater than or equal to the first level, periodically receiving and storing an upstream interference level of a speech communication channel;

storing an upstream carrier level in response to a speech communication request;

obtaining a propagation loss by subtracting the carrier level from transmission power of a mobile station;

obtaining a carrier level of the mobile station by subtracting the propagation loss from transmission power of a base station; and measuring a downstream interference level of a selected speech communication channel.

8. A channel assignment method for a mobile communication system, comprising the steps of:

causing each of a plurality of base stations respectively arranged in a plurality of cells constituting a service area to select, in response to a speech communication request from a mobile station, one of all speech communication channels in an order of priority common to all the cells;

causing the base station to check whether a carrier to interference ratio of the selected speech communication channel is greater than or equal to a first level;

assigning the channel as a speech communication channel for the cell when it is determined on the basis of the check result that the carrier to interference ratio is greater than or equal to the first level;

monitoring signal quality of a currently used speech communication channel;

checking whether the monitored signal quality is less than a second level;

selecting another free speech communication channel of all the speech communication channels in accordance with the common order of priority when it is determined on the basis of the check result that the signal quality is less than the second level;

checking whether a carrier to interference ratio of the selected channel is greater than or equal to a third level; and switching the currently used speech communication channel to the selected speech communication channel when it is determined on the basis of the check result that the carrier to interference ratio is greater than or equal to the third level.

9. A method according to claim 8, wherein if a loss probability within a predetermined period of time is less than a specific value, the first and third levels are increased, and if the loss probability is greater than or equal to the specific value, the first and third levels are decreased.

10. A method according to claim 8, wherein if a channel switching count within a predetermined period of time is greater than or equal to a specific value, the first and third levels are increased.

11. A method according to claim 8, wherein a number of times that the signal quality of the currently used speech communication channel becomes less than the second level and any other free channel having a carrier to interference ratio of greater than or equal to the third level is not found within a predetermined period of time is measured, so that if the number of times is greater than or equal to a specific value, a difference between the first and third levels is increased, and if the number of times is less than the specific value, the difference between the first and third levels is decreased.

12. A method according to claim 8, wherein a number of times that the signal quality of the currently used speech communication channel becomes less than a minimum allowable level within a predetermined period of time is measured, so that if the number of times is greater than or equal to a specific value, the second level is increased, and if the number of times is less than the specific value, the second level is decreased.

13. A method according to claim 8, wherein if a carrier to interference ratio of an arbitrary currently used speech communication channel is greater than or equal to a fourth level and at least one free channel having a priority higher than that of the currently used speech communication channel exists, the currently used speech communication channel is switched to one of the free speech communication channels which has the highest priority.

14. A method according to claim 13, wherein upstream carrier reception levels of all currently used speech communication channels are measured at an arbitrary timing, and an order of selection of the currently used speech communication channels is specified by selecting the currently used speech communication channels in an order to decrease the reception levels.

15. A method according to claim 13, wherein an order of selection of the currently used speech communication channels is specified by selecting the currently used speech communication channels in an order of priority at an arbitrary timing.

16. A method according to claim 13, wherein if a loss probability within a predetermined period of time is less than a specific value, the fourth level is increased, and if the loss probability is greater than or equal to the specific value, the fourth level is decreased.

17. A method according to claim 13, wherein if a channel switching count within a predetermined period of time is greater than or equal to a specific value, the fourth level is increased.

18. A channel assignment method for a mobile communication system, comprising the steps of:

causing each of a plurality of base stations respectively arranged in a plurality of cells constituting a service area to select, in response to a speech communication request from a mobile station, one of all speech communication channels in an order of priority common to all the cells;

causing the base station to check whether a carrier to interference ratio of the selected speech communication channel is greater than or equal to a first level;

assigning the channel as a speech communication channel for the cell when it is determined on the basis of the check result that the carrier to interference ratio is greater than or equal to the first level; and wherein each of the plurality of cells sequentially selects speech communication channels in an order to decrease a difference in carrier frequency from a central value of carrier frequencies of all the speech communication channels.

19. A channel assignment method for a mobile communication system, comprising the steps of:

classifying a plurality of speech communication channels, assigned to perform radio communication between base stations respectively arranged in a plurality of cells constituting a service area and mobile stations in the cells, into first and second groups;

classifying speech communication channels of the second group into a plurality of subgroups;

allocating to each of the base stations the use of speech communication channels belonging to the first group and speech communication channels belonging to one of the subgroup in the second group; and causing each of the base stations to assign, in response to a mobile station request, one of the speech communication channels belonging to the first group and one of the subgroups in the second group, which are allowed to be used, to a corresponding one of the mobile stations.

20. A method according to claim 19, wherein the base station selects one of the first group and one subgroup of the second group, which are allowed to be used, in accordance with a type of the mobile station, and assigning one of the speech communication channels belonging to the selected group.

21. A method according to claim 19, wherein the base station selects one of the first group and one subgroup of the second group, which are allowed to be used, in accordance with an amount of change in propagation loss between the base station and the mobile station, and assigning one of the speech communication channels belonging to the selected group.

22. A method according to claim 19, wherein the base station selects one of the first group and the subgroup, which are allowed to be used, in accordance with a traveling speed of the mobile station, and assigning one of the speech communication channels belonging to the selected group.

23. A method according to claim 19, wherein a speech communication channel to be assigned in response to a speech communication request is selected from the speech communication channels belonging to one subgroup of the second group.

24. A method according to claim 19, wherein channel switching is performed between speech communication channels belonging to the first group and speech communication channels belonging to one subgroup of the second group in accordance with a use rate of the speech communication channels belonging to the second group.

25. A channel assignment method for a mobile communication system in which a service area is constituted by a plurality of cells respectively having base stations arranged therein, and radio speech communication channels are set between the base station and mobile stations in each cell to perform communication, comprising the steps of:

sequentially selecting free speech communication channels from all speech communication channels, in response to speech communication requests, in an order of priority common to all the cells;

checking whether a carrier to interference ratio of the selected speech communication channel is greater than or equal to a first level;

assigning the speech communication channel if it is determined on the basis of the check result that the carrier to interference ratio is greater than or equal to the first level;

monitoring signal quality of a currently used speech communication channel;

checking whether the monitored signal quality is less than a second level;

selecting a free speech communication channel from all the speech communication channels in the common order of priority if it is determined on the basis of the check result that the signal quality is less than the second level;

checking whether a carrier to interference ratio of the selected speech communication channel is greater than or equal to a third level; and switching the currently used speech communication channel to the selected speech communication channel if it is determined on the basis of the check result that the carrier to interference ratio is greater than or equal to the third level.

* * * * *